(12) United States Patent
Jayaraman

(10) Patent No.: US 12,450,660 B2
(45) Date of Patent: Oct. 21, 2025

(54) CHAT SUPPORT PLATFORM WITH CHAT ROUTING BASED ON GEOGRAPHIC LOCATION

(71) Applicant: Truist Bank, Charlotte, NC (US)

(72) Inventor: Barath Jayaraman, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 2 days.

(21) Appl. No.: 18/161,172

(22) Filed: Jan. 30, 2023

(65) Prior Publication Data
US 2024/0257252 A1    Aug. 1, 2024

(51) Int. Cl.
*G06Q 40/06* (2012.01)

(52) U.S. Cl.
CPC .................. *G06Q 40/06* (2013.01)

(58) Field of Classification Search
CPC ..................................... G06Q 40/06
See application file for complete search history.

(56) References Cited

U.S. PATENT DOCUMENTS

| | | | |
|---|---|---|---|
| 7,792,773 B2 * | 9/2010 | McCord | H04M 3/5233 706/47 |
| 9,047,631 B2 * | 6/2015 | Sridharan | G06Q 30/0613 |
| 10,038,787 B2 * | 7/2018 | Tamblyn | H04M 3/54 |
| 10,165,081 B2 * | 12/2018 | D'Agostino | G06Q 20/202 |
| 10,218,651 B2 * | 2/2019 | Schubert | H04L 67/535 |
| 10,348,658 B2 * | 7/2019 | Rodriguez | H04L 51/10 |
| 10,657,589 B2 * | 5/2020 | Acharya | G06Q 40/02 |
| 10,749,822 B2 * | 8/2020 | D'Agostino | H04L 63/08 |
| 11,196,863 B2 * | 12/2021 | Spohrer | H04M 3/5175 |
| 11,381,682 B2 * | 7/2022 | Matula | H04L 51/02 |

OTHER PUBLICATIONS

M. Thisarani and S. Fernando, "Artificial Intelligence for Futuristic Banking," 2021 IEEE International Conference on Engineering, Technology and Innovation (ICE/ITMC), Cardiff, United Kingdom, 2021, pp. 1-13, doi: 10.1109/ICE/ITMC52061.2021.9570253. (Year: 2021).*

A. P. Sam, B. Singh and A. S. Das, "A Robust Methodology for Building an Artificial Intelligent (AI) Virtual Assistant for Payment Processing," 2019 IEEE Technology & Engineering Management Conference (TEMSCON), Atlanta, GA, USA, 2019, pp. 1-6, doi: 10.1109/TEMSCON.2019.8813584. (Year: 2019).*

* cited by examiner

*Primary Examiner* — Calvin L Hewitt, II
*Assistant Examiner* — Steven R Chism
(74) *Attorney, Agent, or Firm* — Jordan IP Law LLC; Michael A. Springs, Esq.

(57) ABSTRACT

A computing device, a computer program product, and a computer-implemented method for delivering enhanced financial services and, more particularly, for facilitating enhanced network communication between a user and a financial institution via a client device. A digital financial management platform for the client device includes a chat support platform that facilitates enhanced chat routing and an enhanced user chat experience. The chat support platform enables a user to have a more efficient chat experience by routing a virtual chat communication session from a virtual support agent to a local branch team member that is located within a predetermined threshold distance from a detected geographic location of the client device.

8 Claims, 16 Drawing Sheets

CHAT SUPPORT PLATFORM WITH CHAT ROUTING BASED ON GEOGRAPHIC LOCATION

TECHNICAL FIELD

The present disclosure relates to a computing device, computer program product, and computer-implemented method for delivering digital financial services and, more particularly, for a chat support platform that facilitates enhanced chat routing and an enhanced user chat experience.

BACKGROUND

Financial institutions that provide financial services are increasingly providing a greater number of client services. In order to alleviate call and chat density from customers over a network environment, such client services include automated virtual support agents or chatbots who supplement human virtual support agents by directly interacting with customers via text chat, phone, instant messaging, etc.

SUMMARY

The present disclosure relates to a computing device, a computer program product, and a computer-implemented method for delivering enhanced digital financial services over a communication network by providing a digital financial management platform for a client device that includes a chat support platform that facilitates enhanced chat routing and an enhanced user chat experience. The chat support platform enables a user to have a more efficient chat experience by routing a virtual chat communication session from a virtual support agent to a local branch team member (e.g., a human support agent of the financial institution) that is located within a predetermined threshold distance from a detected geographic location of the client device.

In accordance with one or more embodiments set forth, illustrated, and described herein, an apparatus may comprise one or more of the following: one or more processors; and a non-transitory memory coupled to the one or more processors, the non-transitory memory including a set of instructions of computer-executable program code, which when executed by the one or more processors, cause the apparatus to: cause or generate, during execution of a mobile application or desktop application associated with a financial institution by a client device of a user over a communication network, a visual display of a chat interface on the client device to facilitate a virtual chat communication session between the user and a virtual support agent of the financial institution; receive, contemporaneously with the virtual chat communication session, a request for one or more financial services offered by the financial institution, from the client device; detect, contemporaneously with the virtual chat communication session, a current geographic location of the client device; and cause or generate, based on the detection, a visual display of a graphical user interface (GUI) on a user interface of the client device, the GUI comprising a user-engageable link that, when engaged by the user, facilitates a routing of the virtual chat communication session to a branch team member of the financial institution that is at a branch office located within a predetermined threshold distance from the detected current geographic location of the client device.

In accordance with one or more embodiments set forth, illustrated, and described herein, an apparatus may comprise one or more of the following: one or more processors; and a non-transitory memory coupled to the one or more processors, the non-transitory memory including a set of instructions of computer-executable program code, which when executed by the one or more processors, cause the apparatus to: cause or generate, during execution of a mobile application or desktop application associated with a financial institution by a client device of a user over a communication network, a visual display of a chat interface on the client device to facilitate a virtual chat communication session between the user and a virtual support agent of the financial institution; receive, from the client device contemporaneously with the virtual chat communication session, a request for one or more financial services offered by the financial institution; detect, contemporaneously with the virtual chat communication session, a current geographic location of the client device; and cause or generate, based on the detection, routing of the virtual chat communication session to a branch team member of the financial institution that is at a branch office located within a predetermined threshold distance from the detected current geographic location of the client device.

In accordance with one or more embodiments set forth, illustrated, and described herein, an apparatus may comprise one or more of the following: one or more processors; and a non-transitory memory coupled to the one or more processors, the non-transitory memory including a set of instructions of computer-executable program code, which when executed by the one or more processors, cause the apparatus to: cause or generate, during execution of a mobile application or desktop application associated with a financial institution by a client device of a user over a communication network, a visual display of a chat interface on the client device to facilitate a virtual chat communication session between the user and a virtual support agent of the financial institution; receive, from the client device contemporaneously with the virtual chat communication session, a request to route the virtual chat communication session to a branch team member team member; detect a current geographic location of the client device; and cause or generate, based on the detection, a visual display of a graphical user interface (GUI) on a user interface of the client device, the GUI comprising a user-engageable link that, when engaged by the user, facilitates a routing of the virtual chat communication session to a branch team member of the financial institution that is at a branch office located within a predetermined threshold distance from the detected current geographic location of the client device.

In accordance with one or more embodiments set forth, illustrated, and described herein, an apparatus may comprise one or more of the following: one or more processors; and a non-transitory memory coupled to the one or more processors, the non-transitory memory including a set of instructions of computer-executable program code, which when executed by the one or more processors, cause the apparatus to: cause or generate, during execution of a mobile application or desktop application associated with a financial institution by a client device of a user over a communication network, a visual display of a chat interface on the client device to facilitate a virtual chat communication session between the user and a virtual support agent of the financial institution; receive, from the client device contemporaneously with the virtual chat communication session, a request to route the virtual chat communication session to a branch team member team member; detect a current geographic location of the client device; and cause or generate, based on the detection, routing of the virtual chat communication session to a branch team member of the financial institution that is at a branch office located within a predetermined threshold distance from the detected current geographic location of the client device.

In accordance with one or more embodiments set forth, illustrated, and described herein, an apparatus may comprise one or more of the following: one or more processors; and a non-transitory memory coupled to the one or more processors, the non-transitory memory including a set of instructions of computer-executable program code, which when executed by the one or more processors, cause the apparatus to: cause or generate, during execution of a mobile application or desktop application associated with a financial institution by a client device of a user over a communication network, a visual display of a chat interface on the client device to facilitate a virtual chat communication session between the user and a virtual support agent of the financial institution; detect, contemporaneously with the virtual chat communication session, a current geographic location of the client device in response to the user initiating the virtual chat communication session; and cause or generate, based on the detection, a visual display of a graphical user interface (GUI) on a user interface of the client device, the GUI comprising a user-engageable link that, when engaged by the user, facilitates a routing of the virtual chat communication session to a branch team member of the financial institution that is at a branch office located within a predetermined threshold distance from the detected current geographic location of the client device.

In accordance with one or more embodiments set forth, illustrated, and described herein, an apparatus may comprise one or more of the following: one or more processors; and a non-transitory memory coupled to the one or more processors, the non-transitory memory including a set of instructions of computer-executable program code, which when executed by the one or more processors, cause the apparatus to: cause or generate, during execution of a mobile application or desktop application associated with a financial institution by a client device of a user over a communication network, a visual display of a chat interface on the client device to facilitate a virtual chat communication session between the user and a virtual support agent of the financial institution; detect, contemporaneously with the virtual chat communication session, a current geographic location of the client device in response to the user initiating the virtual chat communication session; and cause or generate, based on the detection, routing of the virtual chat communication session to a branch team member of the financial institution that is at a branch office located within a predetermined threshold distance from the detected current geographic location of the client device.

In accordance with one or more embodiments set forth, illustrated, and described herein, an apparatus may comprise one or more of the following: one or more processors; and a non-transitory memory coupled to the one or more processors, the non-transitory memory including a set of instructions of computer-executable program code, which when executed by the one or more processors, cause the apparatus to: receive a predetermined threshold distance input setting from a client device of a user executing a mobile application or desktop application associated with a financial institution over a communication network; cause or generate, during execution of a mobile application or desktop application associated with a financial institution by a client device of a user over a communication network, a visual display of a chat interface on the client device to facilitate a virtual chat communication session between the user and a virtual support agent of the financial institution; detect, contemporaneously with the virtual chat communication session, a current geographic location of the client device; and cause or generate, based on the detection, routing of the virtual chat communication session to a branch team member of the financial institution that is at a branch office located within the predetermined threshold distance to the detected current geographic location.

In accordance with each respective apparatus, the set of instructions, which when executed by the one or more processors, cause the apparatus to detect the current geographic location of the client device based on wireless network connectivity data, stored geographic location data, and sensor data relating to the client device.

In accordance with each respective apparatus, the set of instructions, which when executed by the one or more processors, cause the apparatus to conduct branch team member analysis based on stored branch team member data associated with one or more branch team members of the financial institution.

In accordance with each respective apparatus, the branch team member data comprises calendar data, scheduling data, educational data, and professional experience data.

In accordance with each respective apparatus, the set of instructions, which when executed by the one or more processors, cause the apparatus to transmit, temporally before detecting the current geographic location of the client device, a request to the client device to authorize the detection of the current geographic location of the client device.

In accordance with each respective apparatus, the set of instructions, which when executed by the one or more processors, cause the apparatus to detect the current geographic location of the client device in response to receiving authorization from the client device.

In accordance with each respective apparatus, the set of instructions, which when executed by the one or more processors, cause the apparatus to cause or generate the visual display of a GUI comprising a widget on the user interface of the client device, the widget including a professional profile of the local branch team member to whom the chat is being routed.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to execute one or more of the following: cause or generate, during execution of a mobile application or desktop application associated with a financial institution by a client device of a user over a communication network, a visual display of a chat interface on the client device to facilitate a virtual chat communication session between the user and a virtual support agent of the financial institution; receive, from the client device contemporaneously with the virtual chat communication session, a request for one or more financial services offered by the financial institution; detect, contemporaneously with the virtual chat communication session, a current geographic location of the client device; and cause or generate, based on the detection, a visual display of a graphical user interface (GUI) on a user interface of the client device, the GUI comprising a user-engageable link that, when engaged by the user, facilitates a routing of the virtual chat communication session to a branch team member of the financial institution that is at a branch office located within a predetermined threshold distance from the detected current geographic location of the client device.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to execute one or more of the following: cause or generate, during execution of a mobile application or desktop application associated with a financial institution by a client device of a user over a communication network, a visual display of a chat interface on the client device to facilitate a virtual chat communication session between the user and a virtual support agent of the financial institution; receive, from the client device contemporaneously with the virtual chat communication session, a request for one or more financial services offered by the financial institution; detect, contemporaneously with the virtual chat communication session, a current geographic location of the client device; and cause or generate, based on the detection, routing of the virtual chat communication session to a branch team member of the financial institution that is at a branch office located within a predetermined threshold distance from the detected current geographic location of the client device.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to execute one or more of the following: cause or generate, during execution of a mobile application or desktop application associated with a financial institution by a client device of a user over a communication network, a visual display of a chat interface on the client device to facilitate a virtual chat communication session between the user and a virtual support agent of the financial institution; receive, from the client device contemporaneously with the virtual chat communication session, a request to route the virtual chat communication session to a branch team member team member; detect, contemporaneously with the virtual chat communication session, a current geographic location of the client device; and cause or generate, based on the detection, a visual display of a graphical user interface (GUI) on a user interface of the client device, the GUI comprising a user-engageable link that, when engaged by the user, facilitates a routing of the virtual chat communication session to a branch team member of the financial institution that is at a branch office located within a predetermined threshold distance from the detected current geographic location of the client device.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to execute one or more of the following: cause or generate, during execution of a mobile application or desktop application associated with a financial institution by a client device of a user over a communication network, a visual display of a chat interface on the client device to facilitate a virtual chat communication session between the user and a virtual support agent of the financial institution; receive, from the client device contemporaneously with the virtual chat communication session, a request to route the virtual chat communication session to a branch team member team member; detect, contemporaneously with the virtual chat communication session, a current geographic location of the client device; and cause or generate, based on the detection, routing of the virtual chat communication session to a branch team member of the financial institution that is at a branch office located within a predetermined threshold distance from the detected current geographic location of the client device.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to execute one or more of the following: cause or generate, during execution of a mobile application or desktop application associated with a financial institution by a client device of a user over a communication network, a visual display of a chat interface on the client device to facilitate a virtual chat communication session between the user and a virtual support agent of the financial institution;

receive, from the client device contemporaneously with the virtual chat communication session, a request to route the virtual chat communication session to a branch team member team member; detect, contemporaneously with the virtual chat communication session, a current geographic location of the client device; and cause or generate, based on the detection, routing of the virtual chat communication session to a branch team member of the financial institution that is at a branch office located within a predetermined threshold distance from the detected current geographic location of the client device.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to execute one or more of the following: cause or generate, during execution of a mobile application or desktop application associated with a financial institution by a client device of a user over a communication network, a visual display of a chat interface on the client device to facilitate a virtual chat communication session between the user and a virtual support agent of the financial institution; detect, contemporaneously with the virtual chat communication session, a current geographic location of the client device in response to the user initiating the virtual chat communication session; and cause or generate, based on the detection, a visual display of a graphical user interface (GUI) on a user interface of the client device, the GUI comprising a user-engageable link that, when engaged by the user, facilitates a routing of the virtual chat communication session to a branch team member of the financial institution that is at a branch office located within a predetermined threshold distance from the detected current geographic location of the client device.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to execute one or more of the following: cause or generate, during execution of a mobile application or desktop application associated with a financial institution by a client device of a user over a communication network, a visual display of a chat interface on the client device to facilitate a virtual chat communication session between the user and a virtual support agent of the financial institution; detect, contemporaneously with the virtual chat communication session, a current geographic location of the client device; and cause or generate, based on the detection, routing of the virtual chat communication session to a branch team member of the financial institution that is at a branch office located within a predetermined threshold distance from the detected current geographic location of the client device.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to perform one or more of the following: cause or generate, during execution of a mobile application or desktop application associated with a financial institution by a client device of a user over a communication network, a visual display of a chat interface on the client device to facilitate a virtual chat communication session between the user and a virtual support agent of the financial institution; receive, from the client device, a predetermined threshold distance input setting; detect, contemporaneously with the virtual chat communication session, a current geographic location of the client device; and cause or generate, based on the detection, routing of the virtual chat communication session to a branch team member of the financial institution that is at a branch office located within the predetermined threshold distance to the detected current geographic location.

In accordance with each respective computer program product, the set of instructions, which when executed by the one or more processors, cause the computing device to detect the current geographic location of the client device based on wireless network connectivity data, stored geographic location data, and sensor data relating to the client device.

In accordance with each respective computer program product, the set of instructions, which when executed by the one or more processors, cause the computing device to conduct branch team member analysis based on stored branch team member data associated with one or more branch team members of the financial institution.

In accordance with each respective computer program product, the branch team member data comprises calendar data, scheduling data, educational data, and professional experience data.

In accordance with each respective computer program product, the set of instructions, which when executed by the one or more processors, cause the computing device to transmit, temporally before detecting the current geographic location of the client device, a request to the client device to authorize the detection of the current geographic location of the client device.

In accordance with each respective computer program product, the set of instructions, which when executed by the one or more processors, cause the computing device to detect the current geographic location of the client device in response to receiving authorization from the client device.

In accordance with each respective computer program product, the set of instructions, which when executed by the one or more processors, cause the computing device to cause or generate the visual display of a GUI comprising a widget on the user interface of the client device, the widget including a professional profile of the local branch team member to whom the chat is being routed.

In accordance with one or more embodiments set forth, illustrated, and described herein, a computer-implemented method may comprise one or more of the following: causing, by one or more financial institution servers associated with a financial institution during execution of a mobile application or desktop application associated with the financial institution by a client device of a user over a communication network, a visual display of a chat interface on the client device to facilitate a virtual chat communication session between the user and a virtual support agent of the financial institution; receiving, by the one or more financial institution servers contemporaneously with the virtual chat communication session, a request for one or more financial services offered by the financial institution, from the client device; detecting, by the one or more financial institution servers contemporaneously with the virtual chat communication session, a current geographic location of the client device; and causing, by the one or more financial institution servers based on the detection, a visual display of a graphical user interface (GUI) on a user interface of the client device, the GUI comprising a user-engageable link that, when engaged by the user, facilitates a routing of the virtual chat communication session to a branch team member of the financial institution that is at a branch office located within a predetermined threshold distance from the detected current geographic location of the client device.

In accordance with one or more embodiments set forth, illustrated, and described herein, a computer-implemented method may comprise one or more of the following: causing, by one or more financial institution servers associated with a financial institution during execution of a mobile application or desktop application associated with the financial institution by a client device of a user over a communication network, a visual display of a chat interface on the client device to facilitate a virtual chat communication session between the user and a virtual support agent of the financial institution; receiving, from the client device by the one or more financial institution servers contemporaneously with the virtual chat communication session, a request for one or more financial services offered by the financial institution; detecting, by the one or more financial institution servers contemporaneously with the virtual chat communication session, a current geographic location of the client device; and causing, by the one or more financial institution servers based on the detection, routing of the virtual chat communication session to a branch team member of the financial institution that is at a branch office located within a predetermined threshold distance from the detected current geographic location of the client device.

In accordance with one or more embodiments set forth, illustrated, and described herein, a computer-implemented method may comprise one or more of the following: causing, by one or more financial institution servers associated with a financial institution during execution of a mobile application or desktop application associated with the financial institution by a client device of a user over a communication network, a visual display of a chat interface on the client device to facilitate a virtual chat communication session between the user and a virtual support agent of the financial institution; receiving, by the one or more financial institution servers from the client device contemporaneously with the virtual chat communication session, a request to route the virtual chat communication session to a branch team member team member; detecting, by the one or more financial institution servers contemporaneously with the virtual chat communication session, a current geographic location of the client device; and causing, by the one or more financial institution servers based on the detection, a visual display of a graphical user interface (GUI) on a user interface of the client device, the GUI comprising a user-engageable link that, when engaged by the user, facilitates a routing of the virtual chat communication session to a branch team member of the financial institution that is at a branch office located within a predetermined threshold distance from the detected current geographic location of the client device.

In accordance with one or more embodiments set forth, illustrated, and described herein, a computer-implemented method may comprise one or more of the following: causing, by one or more financial institution servers associated with a financial institution during execution of a mobile application or desktop application associated with the financial institution by a client device of a user over a communication network, a visual display of a chat interface on the client device to facilitate a virtual chat communication session between the user and a virtual support agent of the financial institution; receiving, by the one or more financial institution servers from the client device contemporaneously with the virtual chat communication session, a request to route the virtual chat communication session to a branch team member team member; detect a current geographic location of the client device; and causing, by the one or more financial institution servers based on the detection, routing of the virtual chat communication session to a branch team member of the financial institution that is at a branch office located within a predetermined threshold distance from the detected current geographic location of the client device.

In accordance with one or more embodiments set forth, illustrated, and described herein, a computer-implemented method may comprise one or more of the following: causing, by one or more financial institution servers associated with a financial institution during execution of a mobile application or desktop application associated with the financial institution by a client device of a user over a communication network, a visual display of a chat interface on the client device to facilitate a virtual chat communication session between the user and a virtual support agent of the financial institution; detecting, by the one or more financial institution servers from the client device contemporaneously with the virtual chat communication session, a current geographic location of the client device in response to the user initiating the virtual chat communication session; and causing, by the one or more financial institution servers based on the detection, a visual display of a graphical user interface (GUI) on a user interface of the client device, the GUI comprising a user-engageable link that, when engaged by the user, facilitates a routing of the virtual chat communication session to a branch team member of the financial institution that is at a branch office located within a predetermined threshold distance from the detected current geographic location of the client device.

In accordance with one or more embodiments set forth, illustrated, and described herein, a computer-implemented method may comprise one or more of the following: causing, by one or more financial institution servers associated with a financial institution during execution of a mobile application or desktop application associated with the financial institution by a client device of a user over a communication network, a visual display of a chat interface on the client device to facilitate a virtual chat communication session between the user and a virtual support agent of the financial institution; detecting, by the one or more financial institution servers from the client device contemporaneously with the virtual chat communication session, a current geographic location of the client device in response to the user initiating the virtual chat communication session; and causing, by the one or more financial institution servers based on the detection, routing of the virtual chat communication session to a branch team member of the financial institution that is at a branch office located within a predetermined threshold distance from the detected current geographic location of the client device.

In accordance with one or more embodiments set forth, illustrated, and described herein, a computer-implemented method may comprise one or more of the following: receiving, by the one or more financial institution servers, a predetermined threshold distance input setting from a client device of a user executing a mobile application or desktop application associated with the financial institution over a communication network; causing, by one or more financial institution servers associated with a financial institution during execution of a mobile application or desktop application associated with the financial institution by a client device of a user over a communication network, a visual display of a chat interface on the client device to facilitate a virtual chat communication session between the user and a virtual support agent of the financial institution; detecting, by the one or more financial institution servers from the client device contemporaneously with the virtual chat communication session, a current geographic location of the client device in response to the user initiating the virtual chat communication session; and causing, by the one or more financial institution servers based on the detection, routing of the virtual chat communication session to a branch team member of the financial institution that is at a branch office located within the predetermined threshold distance to the detected current geographic location.

In accordance with each respective computer-implemented method, the detection of the current geographic location of the client device is based on wireless network connectivity data, stored geographic location data, and sensor data relating to the client device.

In accordance with each respective computer-implemented method, further comprising, by the one or more financial institution servers, causing the computing device to conduct branch team member analysis based on stored branch team member data associated with one or more branch team members of the financial institution.

In accordance with each respective computer-implemented method, the branch team member data comprises calendar data, scheduling data, educational data, and professional experience data.

In accordance with each respective computer-implemented method, further comprising, by the one or more financial institution servers, transmitting, temporally before detecting the current geographic location of the client device, a request to the client device to authorize the detection of the current geographic location of the client device.

In accordance with each respective computer-implemented method, further comprising detecting, by the one or more financial institution servers, the current geographic location of the client device in response to receiving authorization from the client device.

In accordance with each respective computer-implemented method, further comprising causing, by the one or more financial institution servers, the display of a GUI comprising a widget on the user interface of the client device, the widget including a professional profile of the local branch team member to whom the chat is being routed.

DRAWINGS

The various advantages of the exemplary embodiments will become apparent to one skilled in the art by reading the following specification and appended claims, and by referencing the following drawings, in which:

Figure 5:
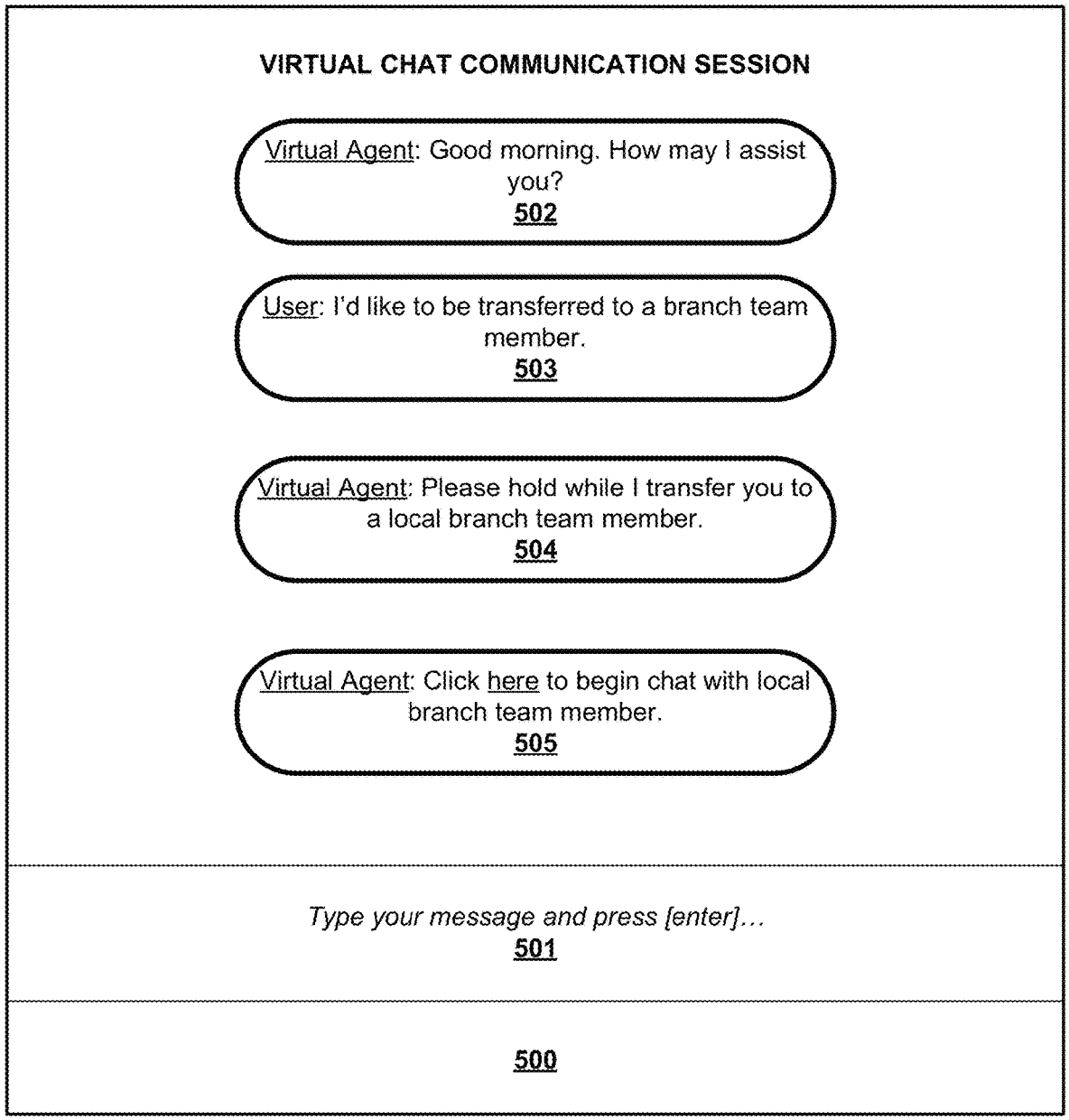
Figure 6:
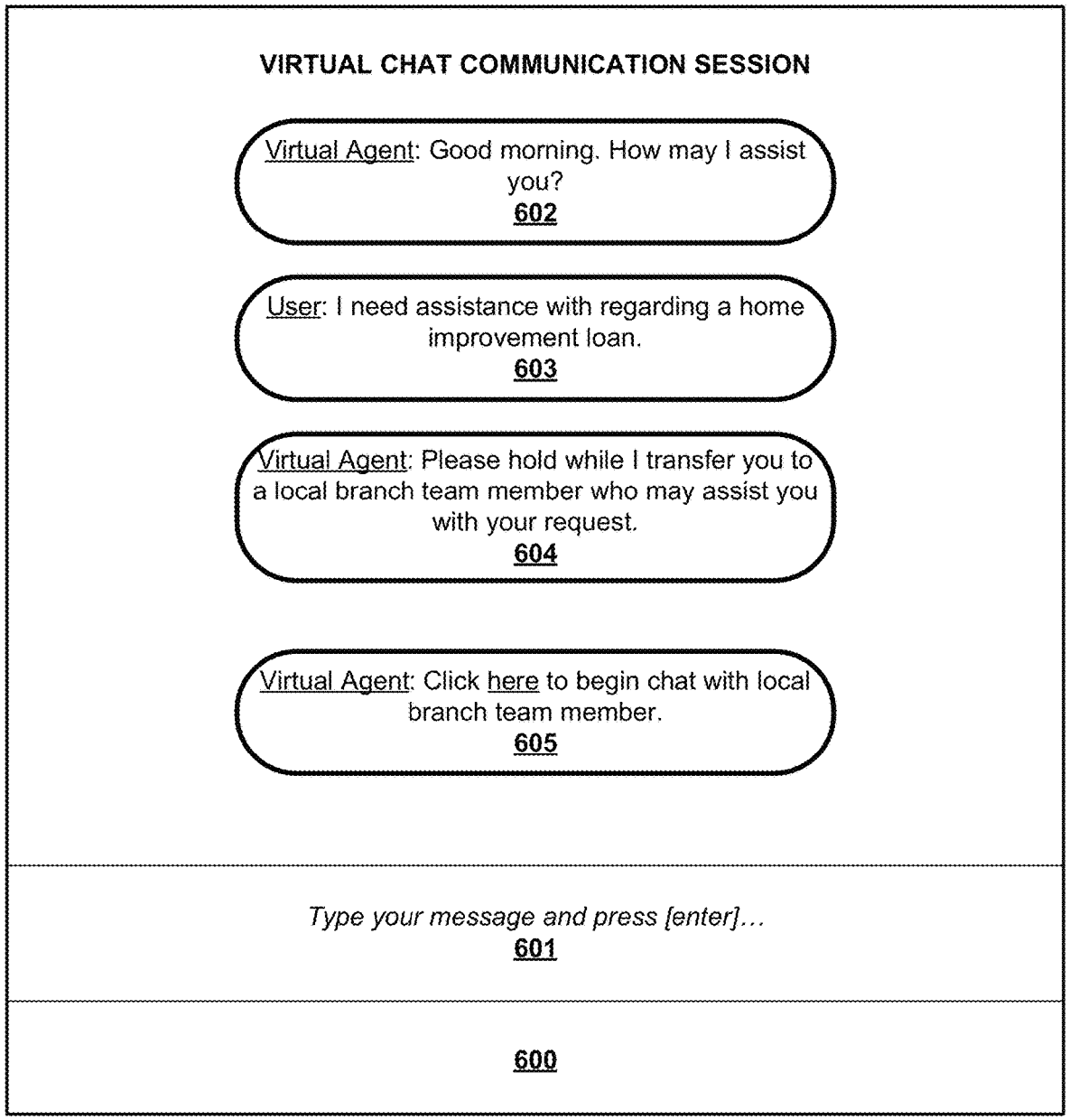
Figure 7:
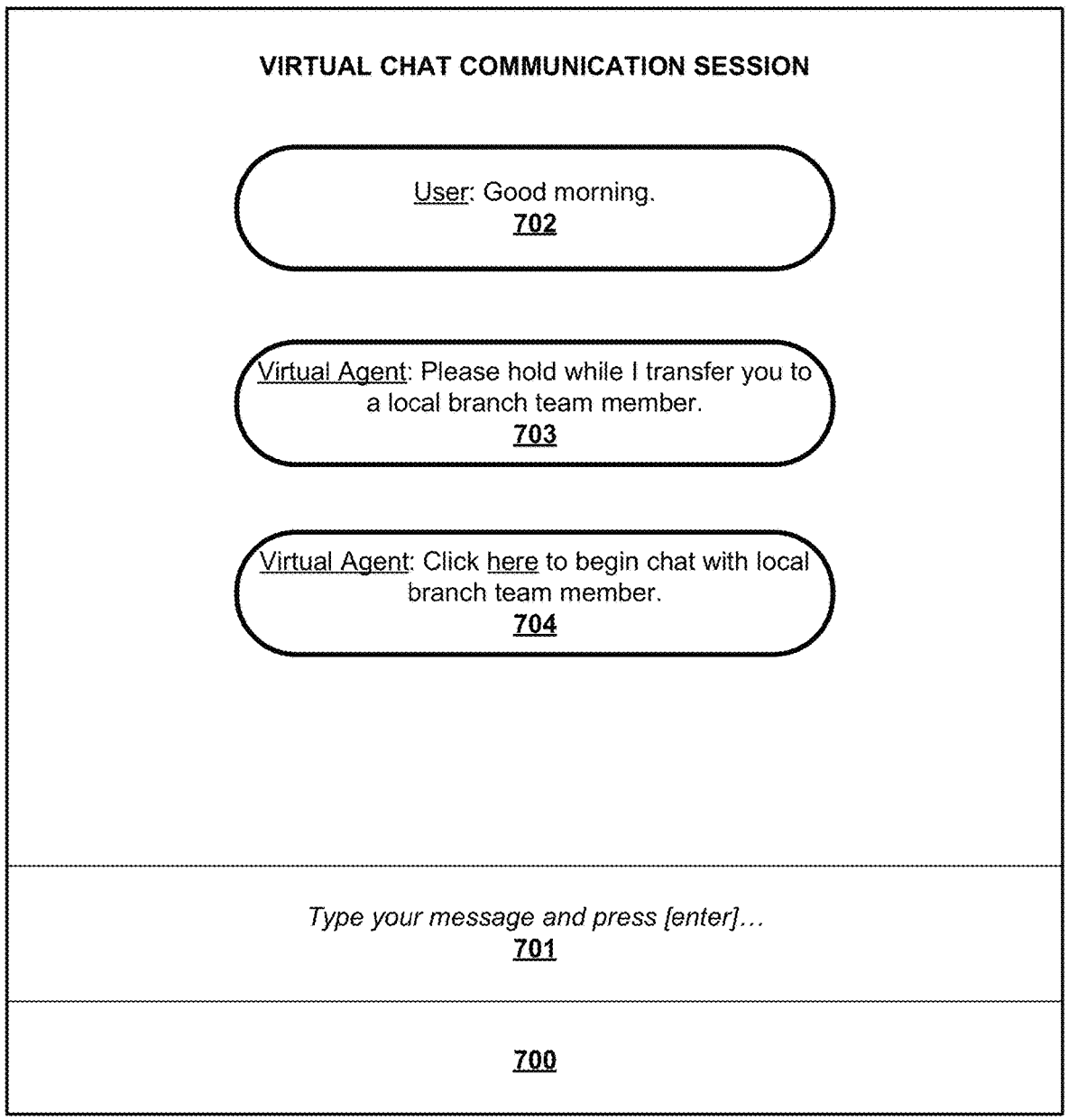

FIGS. 5 through 7 respectively illustrate a virtual chat communication session between a user and a virtual support agent, in accordance with one or more embodiments set forth and described herein.

Figure 8:
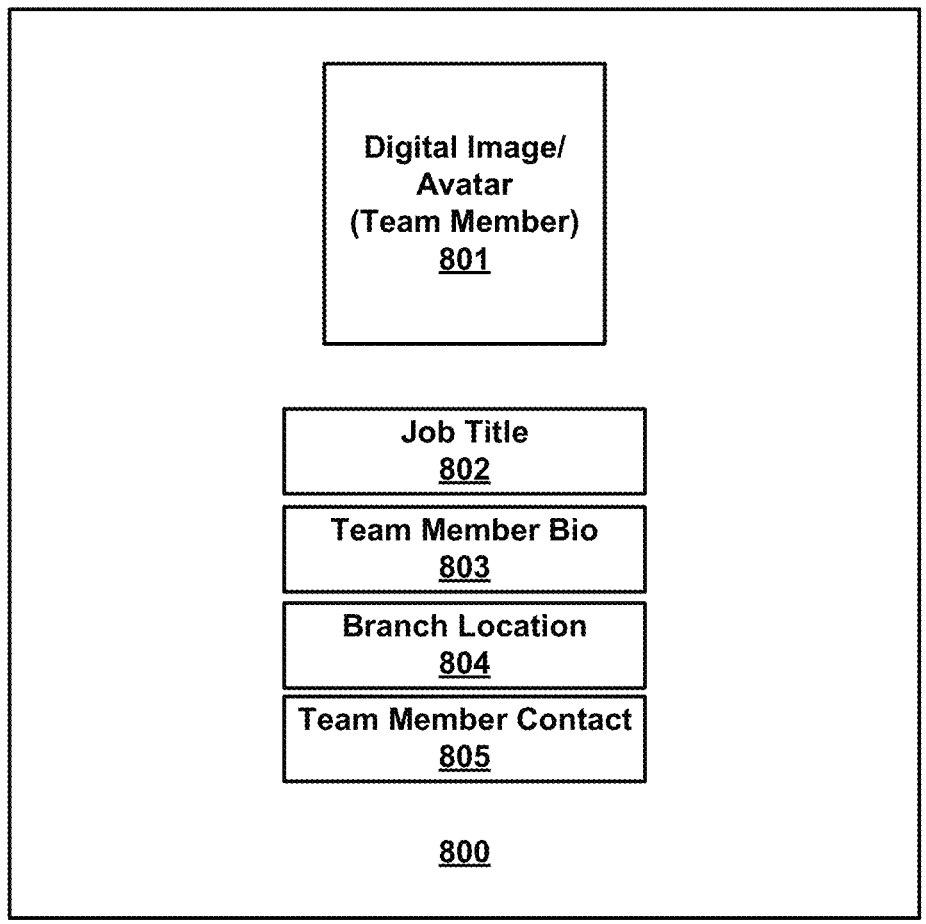

FIG. 8 illustrates a GUI that displays a professional profile of a local branch team member, in accordance with one or more embodiments set forth and described herein FIGS. 9 through 16 respectively illustrate a computer-implemented method, in accordance with one or more embodiments set forth and described herein.

DESCRIPTION

Hereinbelow are example definitions that are provided only for illustrative purposes in this disclosure, and should not be construed to limit the scope of the one or more embodiments disclosed herein in any manner. Some terms are defined below for purposes of clarity. These terms are not rigidly restricted to these definitions. This disclosure contemplates that these terms and other terms may also be defined by their use in the context of this description.

As used herein, "application" relates to software used on a computer (usually by a client and/or client device and can be applications that are targeted or supported by specific classes of machine, such as a mobile application, desktop application, tablet application, and/or enterprise application (e.g., client device application(s) on a client device). Applications may be separated into applications which reside on a client device (e.g., VPN, PowerPoint, Excel) and cloud applications which may reside in the cloud (e.g., Gmail, GitHub). Cloud applications may correspond to applications on the client device or may be other types such as social media applications (e.g., Facebook).

As used herein, "artificial intelligence (AI)" relates to one or more computer system operable to perform one or more tasks that normally require human intelligence, such as visual perception, speech recognition, decision-making, and translation between languages.

As used herein, "machine learning" relates to an application of AI that provides computer systems the ability to automatically learn and improve from data and experience without being explicitly programmed.

As used herein, "computer" relates to a single computer or to a system of interacting computers. A computer is a combination of a hardware system, a software operating system and perhaps one or more software application programs. Examples of a computer include without limitation a personal computer (PC), laptop computer, a smart phone, a cell phone, or a wireless tablet.

As used herein, "client device" relates to any device associated with a user, including personal computers, laptops, tablets, and/or mobile smartphones.

As used herein, "modules" relates to either software modules (e.g., code embodied on a machine-readable medium or in a transmission signal) or hardware modules. Certain embodiments are described herein as including logic or a number of components, modules, or mechanisms. A "hardware module" (or just "hardware") as used herein is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as an FPGA or an ASIC. A hardware module may also include programmable logic or circuitry that is temporarily configured by software to perform certain operations. A hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access.

As used herein, "network" or "networks" relates to any combination of electronic communication networks, including without limitation the Internet, a local area network (LAN), a wide area network, a wireless network, and a cellular network (e.g., 4G, 5G).

As used herein, "processes" or "methods" are presented in terms of processes (or methods) or symbolic representations of operations on data stored as bits or binary digital signals within a machine memory (e.g., a computer memory). These processes or symbolic representations are examples of techniques used by those of ordinary skill in the data processing arts to convey the substance of their work to others skilled in the art. As used herein, a "process" is a self-consistent sequence of operations or similar processing leading to a desired result. In this context, processes and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information.

As used herein, "processor-Implemented module" relates to a hardware module implemented using one or more processors. The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein.

As used herein, "server" relates to a server computer or group of computers that acts to provide a service for a certain function or access to a network resource. A server may be a physical server, a hosted server in a virtual environment, or software code running on a platform.

As used herein, "service" or "application" relates to an online server (or set of servers), and can refer to a web site and/or web application.

As used herein, "software" relates to a set of instructions and associated documentations that tells a computer what to do or how to perform a task. Software includes all different software programs on a computer, such as applications and the operating system. A software application could be written in substantially any suitable programming language, which could easily be selected by one of ordinary skill in the art. The programming language chosen should be compatible with the computer by which the software application is to be executed and, in particular, with the operating system of that computer. Examples of suitable programming languages include without limitation Object Pascal, C, C++, CGI, Java, and Java Scripts. Further, the functions of some embodiments, when described as a series of steps for a method, could be implemented as a series of software instructions for being operated by a processor, such that the embodiments could be implemented as software, hardware, or a combination thereof.

As used herein, "sensor" relates to any device, component and/or system that can perform one or more of detecting, determining, assessing, monitoring, measuring, quantifying, and sensing something.

As used herein, "real-time" relates to a level of processing responsiveness that a user, module, or system senses as sufficiently immediate for a particular process or determination to be made, or that enables the processor to keep up with some external process.

As used herein, "user" relates to a consumer, machine entity, and/or requesting party, and may be human or machine.

In accordance with one or more embodiments set forth, illustrated, and described herein, a chat support platform is provided for a client device of a user having one or more financial accounts residing at one or more financial institution servers of a financial institution. The chat support platform facilitates enhanced chat routing and an enhanced user chat experience. The chat support platform enables a user to have a more efficient chat experience by routing a virtual chat communication session from a virtual to a local branch team member that is located within a predetermined threshold distance from a detected geographic location of the client device.

Figure 1:
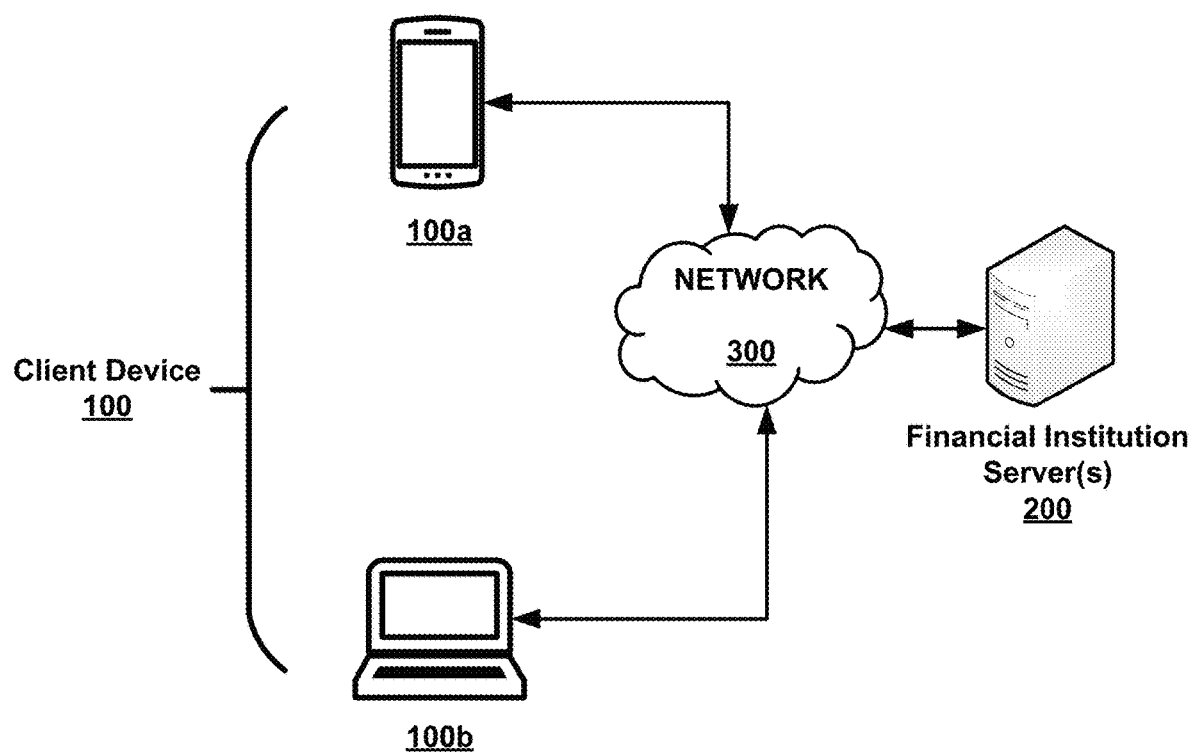
FIG. 1 illustrates a communication environment, in accordance with one or more embodiments set forth and described herein.

Turning to the figures, in which FIG. 1 illustrates a communication environment that facilitates communications between a user and a financial institution. A client device 100 of a user (financial account holder) operating in the communication environment facilitates user access to and user management of one or more financial accounts residing at one or more financial institution servers 200 of the financial institution. The communication environment includes the client device 100, the one or more financial institution servers 200, and a communication network 300 through which communication is facilitated between the client device 100 and the one or more financial institution servers 200.

In accordance with one or more embodiments set forth, described, and/or illustrated herein, the client device 100 comprises a computing device, including but not limited to a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the client device 100 comprising any form of electronic device that optimizes or otherwise transforms the performance and functionality of the one or more embodiments in a manner that falls within the spirit and scope of the principles of this disclosure.

Figure 2:
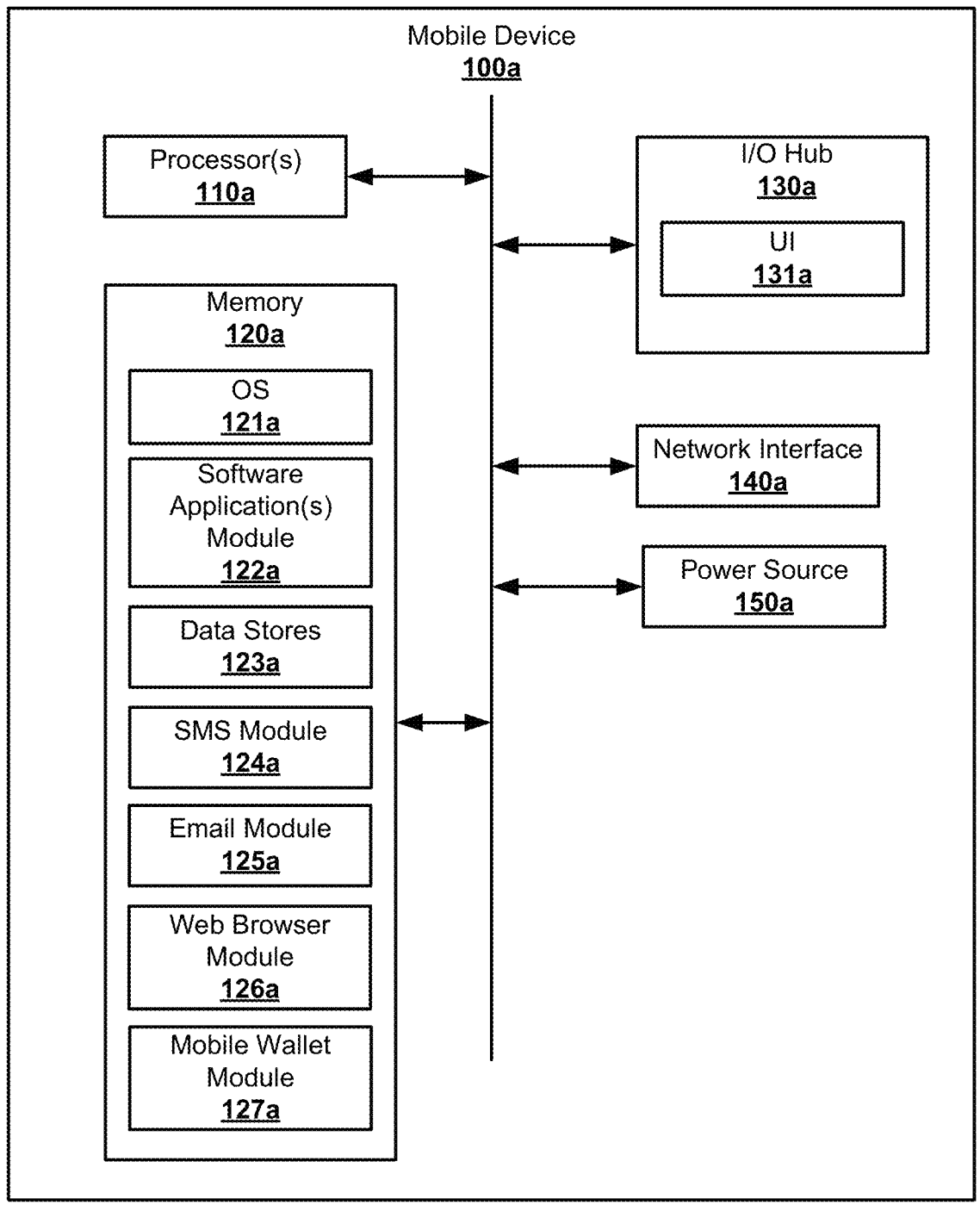
FIG. 2 illustrates a block diagram of a mobile device of FIG. 1.

In the illustrated example embodiment of FIG. 2, the client device 100 comprises a mobile device 100a. Some of the possible operational elements of the mobile device 100a are illustrated in FIG. 2 and will now be described herein. It will be understood that it is not necessary for the mobile device 100a to have all the elements illustrated in FIG. 2. For example, the mobile device 100a may have any combination of the various elements illustrated in FIG. 2. Moreover, the mobile device 100a may have additional elements to those illustrated in FIG. 2.

The mobile device 100a includes one or more processors 110a, a non-transitory memory 120a operatively coupled to the one or more processors 110a, an I/O hub 130a, a network interface 140a, and a power source 150a.

The memory 120a comprises a set of instructions of computer-executable program code. The set of instructions are executable by the one or more processors 110a to cause execution of an operating system 121a and one or more software applications of a software application module 122a that reside in the memory 120a. The one or more software applications residing in the memory 120a includes, but is not limited to, a financial institution application that is associated with the financial institution. The financial institution application comprises a mobile application or desktop application that facilitates establishment of a secure connection between the mobile device 100a and the one or more financial institution servers 200. The one or more processors 110a are operable to execute the mobile application or desktop application to facilitate user access to the one or more financial accounts and user management of the one or more financial accounts.

The memory 120a also includes one or more data stores 123a that are operable to store one or more types of data. The mobile device 100a may include one or more interfaces that facilitate one or more systems or modules thereof to transform, manage, retrieve, modify, add, or delete, the data residing in the data stores 123a. The one or more data stores 123a may comprise volatile and/or non-volatile memory. Examples of suitable data stores 123a include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 123a may be a component of the one or more processors 110a or alternatively, may be operatively connected to the one or more processors 110a for use thereby. As set forth, described, and/or illustrated herein, "operatively connected" may include direct or indirect connections, including connections without direct physical contact.

The memory 120a also includes an SMS module 124a operable to facilitate user transmission and receipt of text messages via the mobile device 100a though the network 300. In one example embodiment, the user may receive text messages from the financial institution that are associated with the user access and the user management of the one or more financial accounts. An email module 125a is operable to facilitate user transmission and receipt of email messages via the mobile device 100a through the network 300. In one example embodiment, the user may receive email messages from the financial institution that are associated with the user access and the user management of the one or more financial accounts. The user may utilize a web browser module 126a that is operable to facilitate user access to one or more websites associated with the financial institution through the network 300. A digital wallet module 127a facilitates the generation of one or more digital wallets associated with the one or more financial accounts.

In accordance with one or more embodiments set forth, described, and/or illustrated herein, the mobile device 100a includes an I/O hub 130a operatively connected to other systems and subsystems of the mobile device 100a. The I/O system 130a may include one or more of an input interface, an output interface, and a network controller to facilitate communications between the mobile device 100a and the one or more financial institution servers 200. The input interface and the output interface may be integrated as a single, unitary user interface 131a, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 110a to execute instructions. The input interface may comprise a user interface (UI), a graphical user interface (GUI), such as, for example, a display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the mobile device 100a may serve as both a component of the input interface and a component of the output interface.

The mobile device 100a also includes a network interface 140a operable to facilitate connection to the network 300. The mobile device 100a further includes a power source 150a that comprises a wired powered source, a wireless power source, a replaceable battery source, or a rechargeable battery source.

Figure 3:
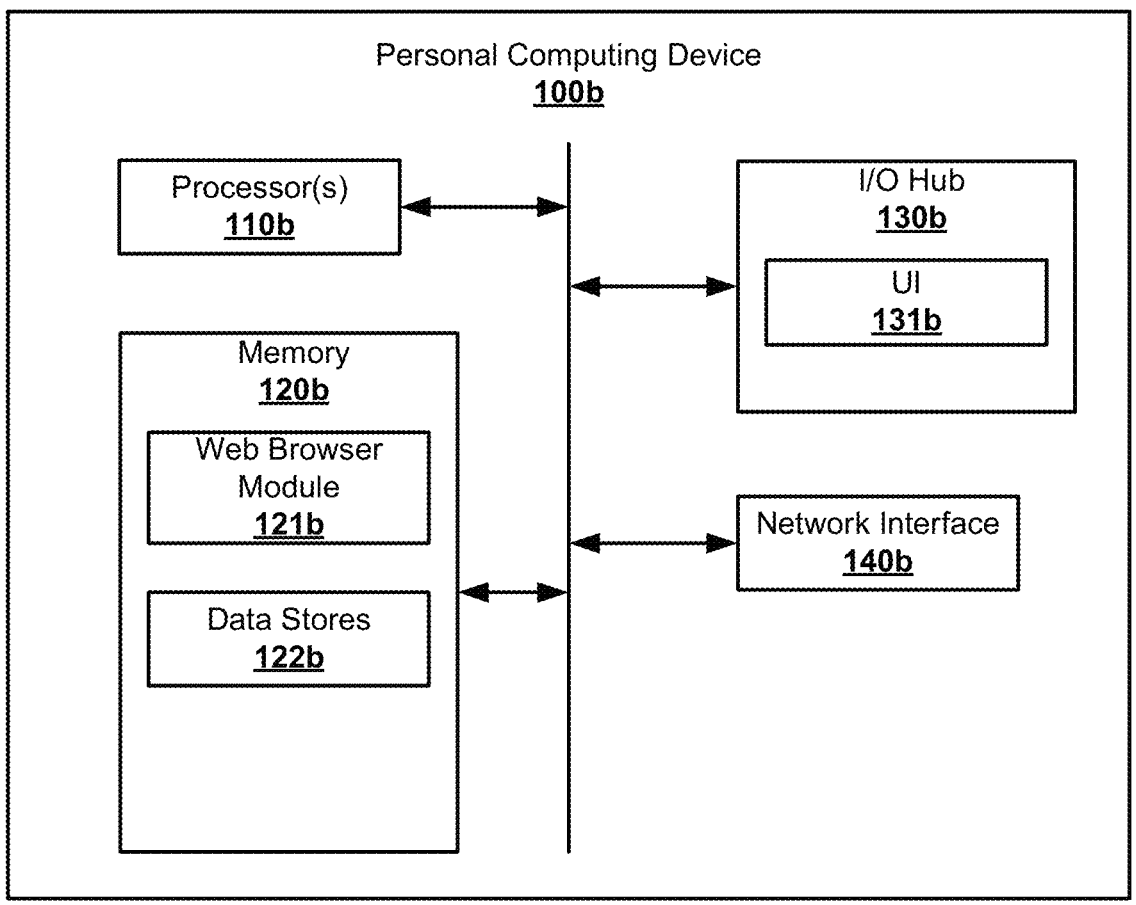
FIG. 3 illustrates a block diagram of the personal computing device of FIG. 1.

In the illustrated example embodiment of FIG. 3, the client device 100 comprises a personal computing device 100b. Some of the possible operational elements of the personal computing device 100b are illustrated in FIG. 3 and will now be described herein. It will be understood that it is not necessary for the personal computing device 100b to have all the elements illustrated in FIG. 3. For example, the personal computing device 100b may have any combination of the various elements illustrated in FIG. 3. Moreover, the personal computing device 100b may have additional elements to those illustrated in FIG. 3.

The personal computing device 100b includes one or more processors 110b, a non-transitory memory 120b operatively coupled to the one or more processors 110A, an I/O hub 130b, and a network interface 140b.

The memory 120b comprises a set of instructions of computer-executable program code. The set of instructions are executable by the one or more processors 110b to cause control of the web browser module 121b in a manner that facilitates user access to a web browser having one or more websites associated with the financial institution through the network 300.

The memory 120b also includes one or more data stores 122b that are operable to store one or more types of data. The personal computing device 100b may include one or more interfaces that facilitate one or more systems or modules thereof to transform, manage, retrieve, modify, add, or delete, the data residing in the data stores 122b. The one or more data stores 122b may comprise volatile and/or non-volatile memory. Examples of suitable data stores 122b include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 122b may be a component of the one or more processors 110b, or alternatively, may be operatively connected to the one or more processors 110b for use thereby. As set forth, described, and/or illustrated herein, "operatively connected" may include direct or indirect connections, including connections without direct physical contact.

In accordance with one or more embodiments set forth, described, and/or illustrated herein, "processor" means any component or group of components that are operable to execute any of the processes described herein or any form of instructions to carry out such processes or cause such processes to be performed. The one or more processors 100b may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 110b may comprise at least one hardware circuit (e.g., an integrated circuit) operable to carry out instructions contained in program code. In embodiments in which there is a plurality of processors, such processors may work independently from each other, or one or more processors may work in combination with each other.

In accordance with one or more embodiments set forth, described, and/or illustrated herein, the personal computing device 100a includes an I/O hub 130b operatively connected to other systems and subsystems of the personal computing device 100a. The I/O system 130b may include one or more of an input interface, an output interface, and a network controller to facilitate communications between the personal computing device 100a and the one or more financial institution servers 200. The input interface and the output interface may be integrated as a single, unitary user interface 131b, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 110b to execute instructions. The input interface may comprise a user interface (UI), a graphical user interface (GUI), such as, for example, a display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the mobile device 100a may serve as both a component of the input interface and a component of the output interface.

The personal computing device 100b also includes a network interface 140b operable to facilitate connection to the network 300.

Figure 4:
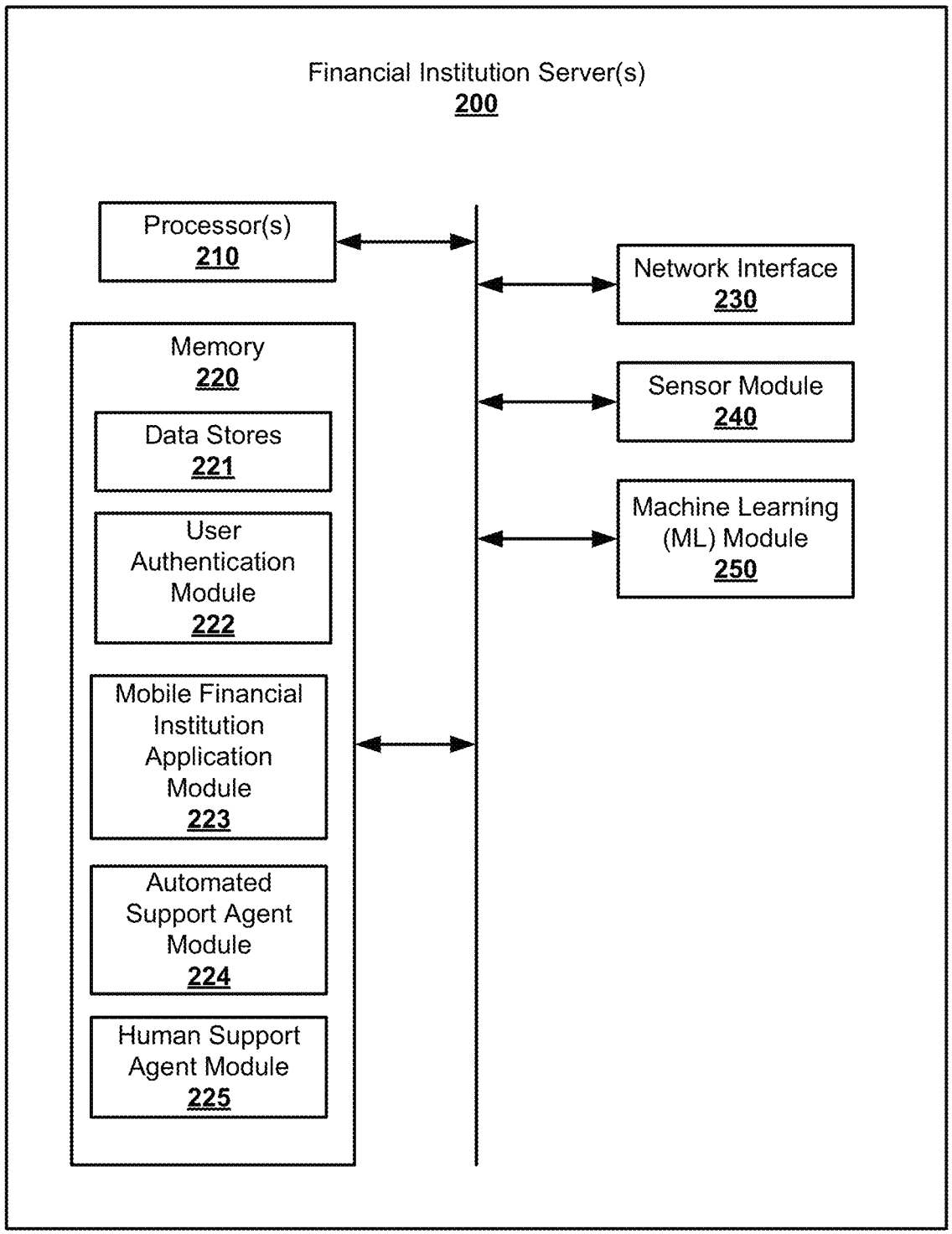
FIG. 4 illustrates a block diagram of the one or more financial institution servers of FIG. 1.

As illustrated in FIG. 4, the one or more financial institution servers 200 includes one or more processors 210, a non-transitory memory 220 operatively coupled to the one or more processors 210, a network interface 230, a sensor module 240, and a machine learning (ML) module 250. Some of the possible operational elements of each server in the one or more financial institution servers 200 are illustrated in FIG. 4 and will now be described herein. It will be understood that it is not necessary for each server in the one or more financial institution servers 200 to have all the elements illustrated in FIG. 4. For example, each server in the one or more financial institution servers 200 may have any combination of the various elements illustrated in FIG. 4. Moreover, each server in the one or more financial institution servers 200 may have additional elements to those illustrated in FIG. 4.

The one or more financial institution servers 200 may be controlled by a system manager (or policy manager) of the financial institution.

In accordance with one or more embodiments set forth, described, and/or illustrated herein, the one or more financial institution servers 200 may comprise a computing device, including but not limited to a server computer, a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the one or more financial institution servers 200 comprising any form of electronic device that optimizes or otherwise transforms the performance and functionality of the one or more embodiments in a manner that falls within the spirit and scope of the principles of this disclosure.

The memory 220 comprises a set of instructions of computer-executable program code. The set of instructions are executable by the one or more processors 210 in manner that facilitates control of a user authentication module 222, a mobile financial institution application module 223 having one or more mobile financial institution applications that reside in the memory 220, an automated virtual support agent module 224, and a human virtual support agent module 225. In accordance with one or more embodiments set forth, described, and/or illustrated herein, the one or more financial institution servers 200 may individually or collectively execute the instructions to perform any one or more of the methodologies set forth, described, and illustrated herein. The virtual support agent module 224 may execute natural language processing (NLP) based on natural language input by the user via the client device 100.

The memory 220 also includes one or more data stores 221 that are operable to store one or more types of data, including but not limited to, user account data, user authentication data, sensor data, etc. For instance, the one or more data stores 221 may comprise a storage location on which one or more electronic files of the transcripts associated with virtual chat communications reside. The one or more data stores 221 may comprise volatile and/or non-volatile memory. Examples of suitable data stores 221 include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 221 may be a component of the one or more processors 210, or alternatively, may be operatively connected to the one or more processors 210 for use thereby. As set forth, described, and/or illustrated herein, "operatively connected" may include direct or indirect connections, including connections without direct physical contact.

The memory 220 may include a single machine-readable medium, or a plurality of media (e.g., a centralized or distributed database, or associated caches and servers) operable to store the instructions. The term "machine-readable medium" shall also be taken to include any medium, or combination of multiple media, that is capable of storing instructions (e.g., software) for execution by a server (e.g., server), such that the instructions, when executed by the one or more processors 210, cause the one or more financial institution servers 200 to perform any one or more of the methodologies set forth, described, and illustrated herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The computer-executable program code may instruct the one or more processors 210 to cause the user authentication module 221 to authenticate a user in order to gain user access to the one or more financial accounts. The user authentication module 221 may be caused to request user input user data or user identification that include, but are not limited to, user identity (e.g., username), a user passcode, a cookie, user biometric data, a private key, a token, and/or another suitable authentication data or information.

The computer-executable program code may instruct the one or more processors 210 to execute certain logic, data-processing, and data-storing functions of the one or more financial institution servers 200, in addition to certain communication functions of the one or more financial institution servers 200. The one or more mobile financial institution applications of the mobile financial institution application module 222 are operable to communicate with the mobile device 100*a* and the personal computing device 100*b* in a manner which facilitates user access to the one or more financial accounts in addition to user management of the one or more financial accounts based on successful user authentication.

The sensor module 240 is operable, at least during execution of the mobile application or desktop application by the client device 100, to dynamically detect, determine, assess, monitor, measure, quantify, and/or sense information about the client device 100. The sensor module 240 may be operable to detect, determine, assess, monitor, measure, quantify and/or sense in real-time. The sensor module 240 may be operable to detect, determine, assess, monitor, measure, quantify, and/or sense geographic location information about the geographic location of the client device 100.

The ML module 250 may include one or more ML algorithms to train one or more machine learning models of the one or more financial institution servers 200 based on data and/or information resided in the memory 220. The ML algorithms may include one or more of a linear regression algorithm, a logical regression algorithm, or a combination of different algorithms. A neural network may also be used to train the system based on the received data. The ML module 250 may analyze the received data and/or information, and transform the data and/or information in a manner which provides enhanced communication between the client device 100 and the one or more financial institution servers 200, while also enhancing user access and management of the one or more financial accounts. The data and/or information may also be up-linked to other systems and modules in the one or more financial institution servers 200 for further processing to discover additional information that may be used to enhance the understanding of the information.

In accordance with one or more embodiments set forth, described, and/or illustrated herein, the network 300 may comprise a wireless network, a wired network, or any suitable combination thereof. For example, the network 300 is operable to support connectivity using any protocol or technology, including, but not limited to wireless cellular, wireless broadband, wireless local area network (WLAN), wireless personal area network (WPAN), wireless short distance communication, Global System for Mobile Communication (GSM), or any other suitable wired or wireless network operable to transmit and receive a data signal.

In accordance with one or more embodiments set forth, described, and/or illustrated herein, a user may, via the client device 100, execute a mobile application or a desktop application associated with the financial institution over the communication network 300.

As illustrated in FIG. 5, upon a user launching the mobile application or the desktop application on the client device 100, and being authenticated by the user authentication module 221, the computer-executable program code may instruct the one or more processors 210 to cause or generate a display of a graphical user interface (GUI) on the user interface 131*a*, 131*b* of the client device 100. The GUI comprises a chat widget 500 that facilitates a virtual chat communication session in natural language communicated verbally and/or textually with an intelligent automated assistant that includes, but is not limited to an automated virtual support agent or chatbot. The communication session comprises natural language input and natural language output in the form of chat messages 502 through 505 between the user and the automated virtual support agent or chatbot. The chat messages 502 through 505 may be in verbal or textual form. The virtual chat communication session may include one or more probing questions (e.g., natural language output) by the automated virtual support agent or chatbot and natural language input in the form of chat messages. A chat box 501 is provided to enter chat messages intended for the virtual support agent (e.g., queries, commands, etc.) which are then visually displayed as a chat message.

During the virtual chat communication session, the user may transmit, via the client device 100, a natural language input request or command (chat message 503) to be transferred to a human virtual support agent of the financial institution. In response thereto, the computer-executable program code may instruct the one or more processors 210 to execute processing or analysis of the request or command (e.g., via parsing and/or natural language processing (NLP)) of the natural language input request or command (chat message 503). In response to executing processing or analysis of the natural language input request or command (message 503), the computer-executable program code may instruct the one or more processors 210 to cause the automated virtual support agent or chatbot to generate a response and transmit a natural language output prompt (chat message 504) asking the user to hold in order to route, transfer, or execute a handover of the virtual chat communication session to a local branch team member.

In particular, in response to receipt of the request, the computer-executable program code may instruct the one or more processors 210 to cause or generate a visual display of a graphical user interface (GUI) on the user interface 131*a*, 131*b* of the client device 100. The GUI may include an electronic notification (e.g., text, email, pop-up notification, etc.) of a request or query for user authorization of a detection of the current geographic location of the client device 100. Responsive to the one or more financial institution servers 200 receiving user authorization from the client device 100, the computer-executable program code may instruct the one or more processors 210 to cause the one or more financial institution servers 200 to detect the current geographic location of the client device 100. Alternatively, this disclosure contemplates the request or query to authorize the detection of the current geographic location of the client device 100 occurring temporally before user authentication is conducted. Alternatively, this disclosure contemplates the computer-executable program code instructing the one or more processors 210 to automatically detect the current geographic location of the client device 100 without prior user authorization.

The computer-executable program code may instruct the one or more processors 210 to cause the sensor module 240 to detect the current geographic location of the client device 100. The detection may be based on wireless network connectivity data, stored geographic location data residing in the memory 220, and sensor data relating to the detected current geographic location of the client device 100. The wireless network connectivity data may include but is not limited to, an internet protocol (IP) address of the client device 100, network identifier for the network 300, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs, etc. The sensor data may include but is not limited to, global positioning system (GPS) data of the client device 100. This disclosure contemplates conducting the geographic location analysis based on any data indicative of a geographic location of the client device 100 and which optimizes or otherwise transforms the performance and functionality of the one or more embodiments in a manner that falls within the spirit and scope of the principles of this disclosure.

The routing, transfer, or handover of the chat will be initiated to a local branch team member who is available at the current moment and whom also has not previously engaged in a predetermine number of virtual chat communication sessions during the business day. In this regard, the computer-executable program code may instruct the one or more processors 210 to cause (e.g., via the mobile financial institution application module 223, the automated virtual support agent module 224, and/or the human support agent module 225), branch team member analysis based on data and information that are detected in real-time or stored in the memory 220. The data and information may include, but is not limited to, an appointment calendar or scheduling information of each local branch team member, the experience level of each local branch team member, and the specialized knowledge/training of each local branch team member. This disclosure contemplates executing the geographic location analysis and the branch team member analysis contemporaneously (i.e., in parallel or simultaneously) to each other.

Based on the detected current geographic location and/or the branch team member analysis, the computer-executable program code may instruct the one or more processors 210 to cause (e.g., via the mobile financial institution application module 223, the automated virtual support agent module 224, and/or the human support agent module 225), the generation of a response and then a transmission of an electronic notification of the response via chat message 505 that includes a user-engageable link that, when engaged by the user, facilitates the routing, transfer, or handover of the chat to a local branch team member of the financial institution that is at a branch office located within a predetermined threshold distance from the detected current geographic location of the client device 100. The local branch team member may have conducted a previous virtual chat communication session with the user that is stored in memory 220.

The branch office can be located a predetermined threshold distance from the detected current geographic location. The predetermined threshold distance can be set by the user via the client device 100 and as an input setting that is stored in memory 220. For example, the computer-executable program code may instruct the one or more processors 210 to cause or generate a visual display of a GUI on the UI 131*a*, 131*b* of the client device 100, the GUI including one or more tiles having a toggle-switch or check boxes that enable the user to select between a plurality of threshold distances (e.g., 5 miles, 10 miles, 25 miles, etc.).

Alternatively, the computer-executable program code may instruct the one or more processors 210 to cause (e.g., via the mobile financial institution application module 223, the automated virtual support agent module 224, and/or the human virtual support agent module 225), based on the detected current geographic location and/or the branch team member analysis, routing of the virtual chat communication session to a branch team member of the financial institution that is at a branch office located within a predetermined threshold distance from the detected current geographic location of the client device.

As illustrated in FIG. 6, upon a user launching the mobile application or the desktop application on the client device 100, and being authenticated by the user authentication module 221, the computer-executable program code may instruct the one or more processors 210 to cause or generate a visual display of a graphical user interface (GUI) on the user interface 131*a*, 131*b* of the client device 100. The GUI comprises a chat interface or widget 600 that facilitates a virtual chat communication session in natural language communicated verbally and/or textually with an intelligent automated assistant that includes, but is not limited to an automated virtual support agent or chatbot. The communication session comprises natural language input and natural language output in the form of chat messages 602 through 605 between the user and the automated virtual support agent or chatbot. The chat messages 602 through 605 may be in verbal or textual form. A chat box 601 is provided to enter chat messages intended for the virtual support agent (e.g., queries, commands, etc.) which are then visually displayed as a chat message.

During the virtual chat communication session, the user may transmit, via the client device 100, a natural language input request or command (chat message 603) for a specific financial service (e.g., home loan, commercial loan, etc.) that is offered by the financial institution. Such financial services may include, but are not limited to, a personal financial services, commercial financial services, and wealth management financial services. In response thereto, the computer-executable program code may instruct the one or more processors 210 to execute processing or analysis (e.g., via parsing and/or NLP) of the natural language input command (chat message 603). In response to executing the processing or analysis of the natural language input request or command (chat message 603), the computer-executable program code may instruct the one or more processors 210 to cause the automated virtual support agent or chatbot to transmit a natural language output response (chat message 604) prompting or asking the user to hold in order to route, transfer, or execute a handover of the virtual chat communication session to a local branch team member having specialized knowledge and/or experience in the financial service being requested by the user.

In particular, in response to receipt of the request, the computer-executable program code may instruct the one or more processors 210 to cause or generate a visual display of a graphical user interface (GUI) on the user interface 131*a*, 131*b* of the client device 100. The GUI may include an electronic notification (e.g., text, email, pop-up notification, etc.) of a request or query for user authorization of a detection of the current geographic location of the client device 100. Responsive to the one or more financial institution servers 200 receiving or acquiring user authorization from the client device 100, the computer-executable program code may instruct the one or more processors 210 to cause the one or more financial institution servers 200 to detect the current geographic location of the client device 100. Alternatively, this disclosure contemplates the request or query to authorize the detection of the current geographic location of the client device 100 occurring temporally before user authentication is conducted. Alternatively, this disclosure contemplates the computer-executable program code instructing the one or more processors 210 to automatically detect the current geographic location of the client device 100 without prior user authorization.

The computer-executable program code may instruct the one or more processors 210 to cause the sensor module 240 to detect the current geographic location of the client device 100. The detection may be based on wireless network connectivity data, stored geographic location data residing in the memory 220, and sensor data relating to the detected current geographic location of the client device 100. The wireless network connectivity data may include but is not limited to, an internet protocol (IP) address of the client device 100, network identifier for the network 300, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs, etc. The sensor data may include but is not limited to, global positioning system (GPS) data of the client device 100. This disclosure contemplates conducting the geographic location analysis based on any data indicative of a geographic location of the client device 100 and which optimizes or otherwise transforms the performance and functionality of the one or more embodiments in a manner that falls within the spirit and scope of the principles of this disclosure.

The routing, transfer, or handover of the chat will be initiated to a local branch team member who is available at the current moment and whom also has not previously engaged in a predetermine number of virtual chat communication sessions during the business day. In this regard, the computer-executable program code may instruct the one or more processors 210 to cause (e.g., via the mobile financial institution application module 223, the automated virtual support agent module 224, and/or the human virtual support agent module 225), branch team member analysis based on data and information that are detected in real-time or stored in the memory 220. The data and information may include, but is not limited to, an appointment calendar or scheduling information of each local branch team member, the experience level of each local branch team member, and the specialized knowledge/training of each local branch team member. This disclosure contemplates executing the geographic location analysis and the branch team member analysis contemporaneously (i.e., in parallel) to each other.

Based on the detected current geographic location and/or the branch team member analysis, the computer-executable program code may instruct the one or more processors 210 to cause (e.g., via the mobile financial institution application module 223, the automated virtual support agent module 224, and/or the human virtual support agent module 225), the transmission of an electronic notification via message 601*d* that includes a user-engageable link that, when engaged by the user, facilitates the routing, transfer, or handover of the chat to a local branch team member of the financial institution that is at a branch office located within a predetermined threshold distance from the detected current geographic location of the client device 100. The local branch team member may have specialized knowledge and/or experience in the financial service being requested by the user. The local branch team member may have conducted a previous virtual chat communication session with the user that is stored in memory 220.

The branch office can be located a predetermined threshold distance from the detected current geographic location. The predetermined threshold distance can be set by the user via the client device 100 and as input setting that is stored in memory 220. For example, the computer-executable program code may instruct the one or more processors 210 to cause or generate a visual display of a GUI on the UI 131*a*, 131*b* of the client device 100, the GUI including one or more tiles having a toggle-switch or check boxes that enable the user to select between a plurality of threshold distances (e.g., 5 miles, 10 miles, 25 miles, etc.).

Alternatively, the computer-executable program code may instruct the one or more processors 210 to cause (e.g., via the mobile financial institution application module 223, the automated virtual support agent module 224, and/or the human virtual support agent module 225), based on the detected current geographic location and/or the branch team member analysis, routing of the virtual chat communication session to a branch team member of the financial institution that is at a branch office located within a predetermined threshold distance from the detected current geographic location of the client device 100.

As illustrated in FIG. 7, upon a user launching the mobile application or the desktop application on the client device 100, and being authenticated by the user authentication module 221, the computer-executable program code may instruct the one or more processors 210 to cause or generate a visual display of a graphical user interface (GUI) on the user interface 131*a*, 131*b* of the client device 100. The GUI comprises a chat interface or widget 700 that facilitates a virtual chat communication session in natural language communicated verbally and/or textually with an intelligent automated assistant that includes, but is not limited to an automated virtual support agent or chatbot. The communication session comprises natural language input and natural language output in the form of chat messages 702 through 704 between the user and the automated virtual support agent or chatbot. The chat messages 702 through 704 may be in verbal or textual form. A chat box 701 is provided to enter chat messages intended for the virtual support agent (e.g., queries, commands, etc.) which are then visually displayed as a chat message.

During the virtual chat communication session, the user may transmit, via the client device 100, a natural language input message (chat message 702) comprising a general greeting. In response thereto, the computer-executable program code may instruct the one or more processors 210 to execute processing or analysis (e.g., via parsing and/or NLP) of the natural language input (chat message 702). In response to executing the processing or analysis of the natural language input message (chat message 702), the computer-executable program code may instruct the one or more processors 210 to cause the automated virtual support agent or chatbot to generate a response and transmit a natural language output reply (message 703) prompting or asking the user to hold in order to route, transfer, or execute a handover of the virtual chat communication session to a local branch team member.

In particular, in response to receipt of the request, the computer-executable program code may instruct the one or more processors 210 to cause or generate a visual display of a graphical user interface (GUI) on the user interface 131a, 131b of the client device 100. The GUI may include an electronic notification (e.g., text, email, pop-up notification, etc.) of a request or query for user authorization of a detection of the current geographic location of the client device 100. Responsive to the one or more financial institution servers 200 receiving user authorization from the client device 100, the computer-executable program code may instruct the one or more processors 210 to cause the one or more financial institution servers 200 to detect the current geographic location of the client device 100. Alternatively, this disclosure contemplates the request or query to authorize the detection of the current geographic location of the client device 100 occurring temporally before user authentication is conducted. Alternatively, this disclosure contemplates the computer-executable program code instructing the one or more processors 210 to automatically detect the current geographic location of the client device 100 without prior user authorization.

The computer-executable program code may instruct the one or more processors 210 to cause the sensor module 240 to detect the current geographic location of the client device 100. The detection may be based on wireless network connectivity data, stored geographic location data residing in the memory 220, and sensor data relating to the detected current geographic location of the client device 100. The wireless network connectivity data may include but is not limited to, an internet protocol (IP) address of the client device 100, network identifier for the network 300, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs, etc. The sensor data may include but is not limited to, global positioning system (GPS) data of the client device 100. This disclosure contemplates conducting the geographic location analysis based on any data indicative of a geographic location of the client device 100 and which optimizes or otherwise transforms the performance and functionality of the one or more embodiments in a manner that falls within the spirit and scope of the principles of this disclosure.

The routing, transfer, or handover of the chat will be initiated to a local branch team member who is available at the current moment and whom also has not previously engaged in a predetermine number of virtual chat communication session sessions during the business day. In this regard, the computer-executable program code may instruct the one or more processors 210 to cause (e.g., via the mobile financial institution application module 223, the automated virtual support agent module 224, and/or the human virtual support agent module 225), branch team member analysis based on data and information that are detected in real-time or stored in the memory 220. The data and information may include, but is not limited to, an appointment calendar or scheduling information of each local branch team member, the experience level of each local branch team member, and the specialized knowledge/training of each local branch team member. This disclosure contemplates executing the geographic location analysis and the branch team member analysis contemporaneously (i.e., in parallel) to each other.

Based on the detected current geographic location and/or the branch team member analysis, the computer-executable program code may instruct the one or more processors 210 to cause (e.g., via the mobile financial institution application module 223, the automated virtual support agent module 224, and/or the human virtual support agent module 225), the generation of a response and the transmission of the response as an electronic notification via chat message 704 that includes a user-engageable link that, when engaged by the user, facilitates the routing, transfer, or handover of the virtual chat communication session to a local branch team member of the financial institution that is at a branch office located within a predetermined threshold distance from the detected current geographic location of the client device 100. The local branch team member may have specialized knowledge and/or experience in the financial service being requested by the user. The local branch team member may have conducted a previous virtual chat communication session with the user that is stored in memory 220.

The branch office can be located a predetermined threshold distance from the detected current geographic location. The predetermined threshold distance can be set by the user via the client device 100 and as input setting that is stored in memory 220. For example, the computer-executable program code may instruct the one or more processors 210 to cause or generate a visual display of a GUI on the UI 131a, 131b of the client device 100, the GUI including one or more tiles having a toggle-switch or check boxes that enable the user to select between a plurality of threshold distances (e.g., 5 miles, 10 miles, 25 miles, etc.).

Alternatively, the computer-executable program code may instruct the one or more processors 210 to cause (e.g., via the mobile financial institution application module 223, the automated virtual support agent module 224, and/or the human virtual support agent module 225), based on the detected current geographic location and/or the branch team member analysis, routing of the virtual chat communication session to a branch team member of the financial institution that is at a branch office located within a predetermined threshold distance from the detected current geographic location of the client device 100.

As illustrated in FIG. 8, alternatively or additionally, in accordance with one or more embodiments set forth, described, and/or illustrated herein, the computer-executable program code may instruct the one or more processors 210 to cause the display of a GUI comprising a chat interface or widget 800 on the user interface 131a, 131b of the client device 100. For example, the widget 800 includes a professional profile of the local branch team member to whom the virtual chat communication session is being routed or transferred. The profile may include a plurality of tiles that visually display information related to the local branch team member. Such tiles may include, but is not limited to, a tile 801 comprising a digital image (e.g., an avatar or a photographic image) of the local branch team member, a tile 802 comprising a job title of the local branch team member, a tile 803 comprising a biography of the local branch team member, a tile 804 comprising a specific geographic location of the branch of the financial institution associated with the local branch team member, and a tile 805 comprising contact information (e.g., email address, telephone number, etc.) of the local branch team member.

Illustrated examples shown in FIGS. 9 to 12 set forth computer-implemented methods 900, 1000, 1100, and 1200. In one or more examples, the respective flowcharts of the computer-implemented methods 900, 1000, 1100, and 1200 may be implemented by the one or more processors 210 of the one or more financial institution servers 200. In particular, the computer-implemented methods 900, 1000, 1100, and 1200 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

In accordance with one or more embodiments set forth, described, and/or illustrated herein, software executed by the one or more financial institution servers 200 provides functionality described or illustrated herein. In particular, software executed by the one or more processors 210 is operable to perform one or more processing blocks of the computer-implemented methods 900, 1000, 1100, and 1200 set forth, described, and/or illustrated herein, or provides functionality set forth, described, and/or illustrated.

Figure 9:
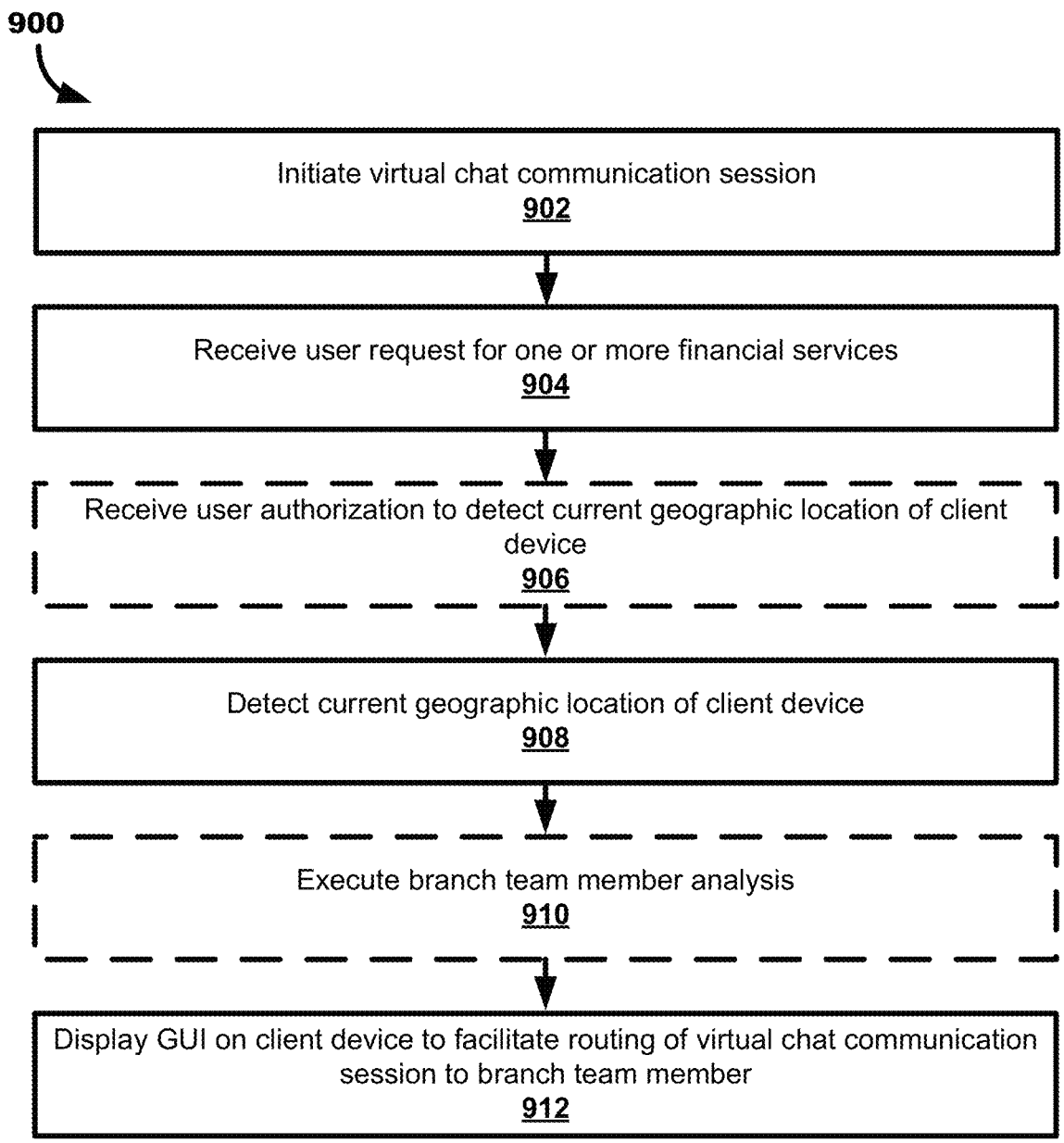

As illustrated in FIG. 9, illustrated process block 902 includes causing, by one or more financial institution servers associated with a financial institution during execution of a mobile application or desktop application associated with the financial institution by a client device of a user over a communication network, a visual display of a chat interface on the client device to facilitate a virtual chat communication session between the user and a virtual support agent of the financial institution.

The computer-implemented method 900 may then proceed to illustrated process block 904, which includes receiving, by one or more financial institution servers contemporaneously with the virtual chat communication session, a request from the client device for one or more financial services offered by the financial institution.

The computer-implemented method 900 may then proceed to illustrated process block 906, which includes receiving, by the one or more financial institution servers from the client device, authorization to detect a current geographic location of the client device. The authorization can occur temporally before initiation of the virtual chat communication session, or can occur contemporaneously therewith.

The computer-implemented method 900 may then proceed to illustrated process block 908, which includes detecting, by the one or more financial institution servers in response to receiving the authorization, a current geographic location of the client device. The detection can occur temporally before initiation of the virtual chat communication session, or can occur contemporaneously therewith.

In accordance with process block 908, the detection of the current geographic location of the client device is based on wireless network connectivity data, stored geographic location data, and sensor data relating to the client device.

The computer-implemented method 900 may then proceed to illustrated process block 910, which includes executing, by the one or more financial institution servers contemporaneously with the virtual chat communication session, branch team member analysis based on stored branch team member data associated with one or more branch team members of the financial institution.

In accordance with process block 910, the branch team member data comprises calendar data, scheduling data, educational data, and professional experience data.

The computer-implemented method 900 may then proceed to illustrated process block 912, which includes causing, by the one or more financial institution servers based on the detection and contemporaneously with the virtual chat communication session, a visual display of a graphical user interface (GUI) on a user interface of the client device, the GUI comprising a user-engageable link that, when engaged by the user, facilitates a routing of the virtual chat communication session to a branch team member of the financial institution that is at a branch office located within a predetermined threshold distance from the detected current geographic location of the client device.

Figure 10:
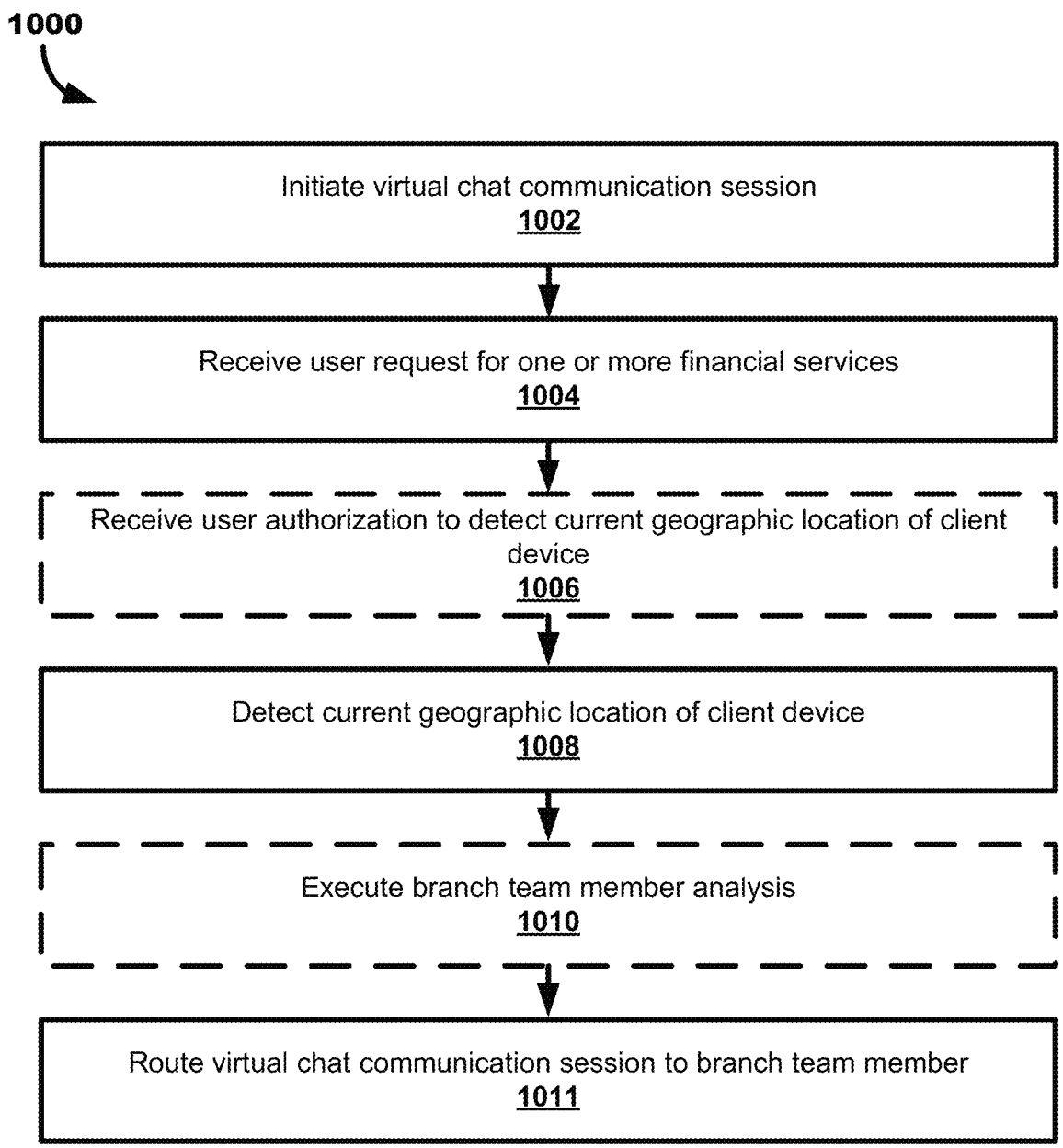

As illustrated in FIG. 10, illustrated process block 1002 includes causing, by one or more financial institution servers associated with a financial institution during execution of a mobile application or desktop application associated with the financial institution by a client device of a user over a communication network, a visual display of a chat interface on the client device to facilitate a virtual chat communication session between the user and a virtual support agent of the financial institution.

The computer-implemented method 1000 may then proceed to illustrated process block 1004, which includes receiving, by one or more financial institution servers, contemporaneously with the virtual chat communication session, a request from the client device for one or more financial services offered by the financial institution.

The computer-implemented method 1000 may then proceed to illustrated process block 1006, which includes receiving, by the one or more financial institution servers from the client device, authorization to detect a current geographic location of the client device. The authorization can occur temporally before initiation of the virtual chat communication session, or can occur contemporaneously therewith.

The computer-implemented method 1000 may then proceed to illustrated process block 1008, which includes detecting, by the one or more financial institution servers in response to receiving the authorization, a current geographic location of the client device. The detection can occur temporally before initiation of the virtual chat communication session, or can occur contemporaneously therewith.

In accordance with process block 1008, the detection of the current geographic location of the client device is based on wireless network connectivity data, stored geographic location data, and sensor data relating to the client device.

The computer-implemented method 1000 may then proceed to illustrated process block 1010, which includes executing, by the one or more financial institution servers contemporaneously with the virtual chat communication session, branch team member analysis based on stored branch team member data associated with one or more branch team members of the financial institution.

In accordance with process block 1010, the branch team member data comprises calendar data, scheduling data, educational data, and professional experience data.

The computer-implemented method 1000 may then proceed to illustrated process block 1012, which includes causing, by the one or more financial institution servers based on the detection, routing of the virtual chat communication session to a branch team member of the financial institution that is located at a branch office that is within a predetermined threshold distance from the detected current geographic location of the client device.

Figure 11:
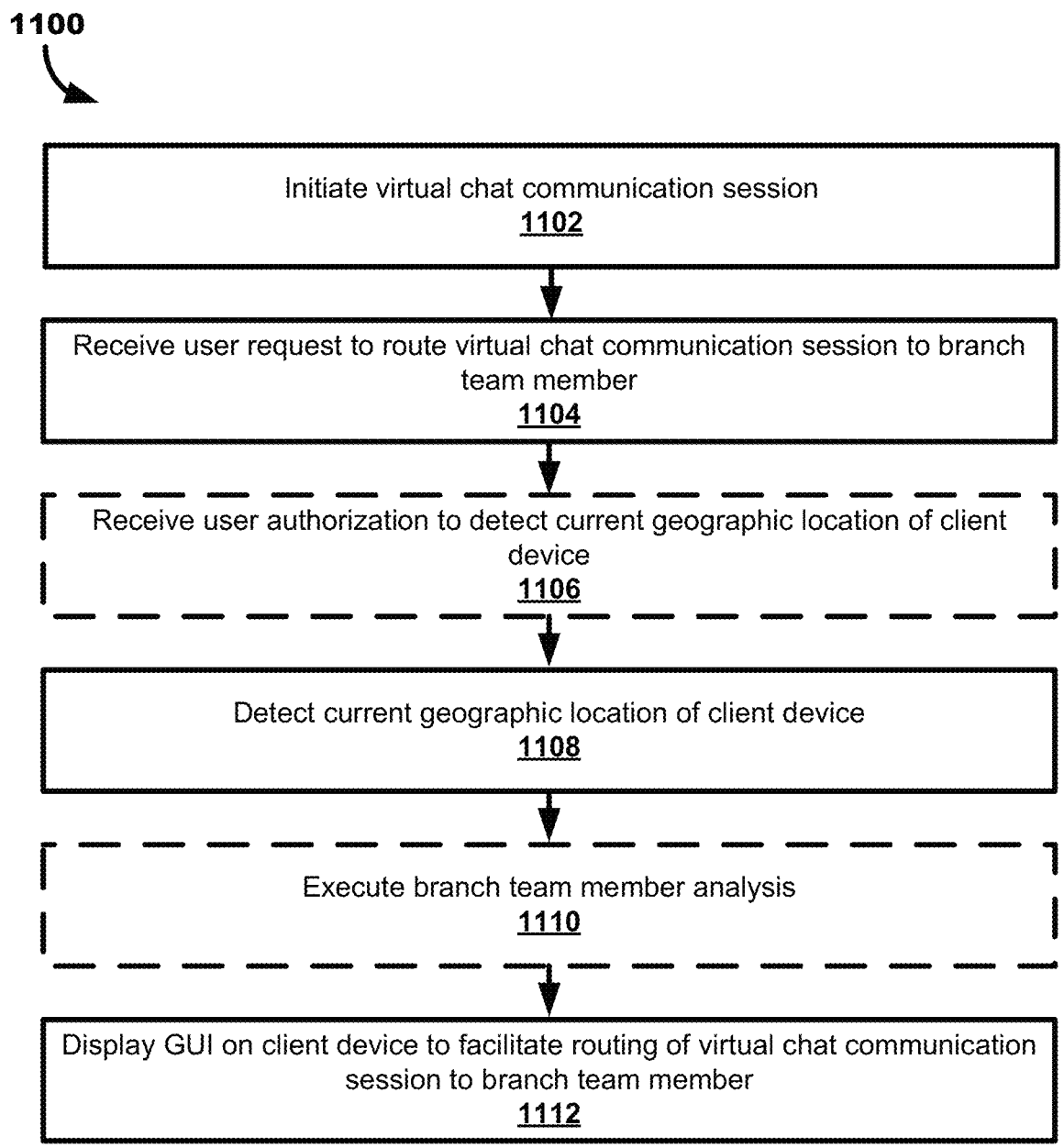

As illustrated in FIG. 11, illustrated process block 1102 includes causing, by one or more financial institution servers associated with a financial institution during execution of a mobile application or desktop application associated with the financial institution by a client device of a user over a communication network, a visual display of a chat interface on the client device to facilitate a virtual chat communication session between the user and a virtual support agent of the financial institution.

The computer-implemented method 1100 may then proceed to illustrated process block 1104, which includes receiving, by the one or more financial institution servers contemporaneously with the virtual chat communication session, a request to route the virtual chat communication session to a branch team member of the financial institution.

The computer-implemented method 1100 may then proceed to illustrated process block 1106, which includes receiving, by the one or more financial institution servers from the client device, authorization to detect, a current geographic location of the client device. The authorization can occur temporally before initiation of the virtual chat communication session, or can occur contemporaneously therewith.

The computer-implemented method 1100 may then proceed to illustrated process block 1108, which includes detecting, by the one or more financial institution servers in response to receiving the authorization, a current geographic location of the client device. The detection can occur temporally before initiation of the virtual chat communication session, or can occur contemporaneously therewith.

In accordance with process block 1108, the detection of the current geographic location of the client device is based on wireless network connectivity data, stored geographic location data, and sensor data relating to the client device. The detection can occur temporally before initiation of the virtual chat communication session, or can occur contemporaneously therewith.

The computer-implemented method 1100 may then proceed to illustrated process block 1110, which includes executing, by the one or more financial institution servers contemporaneously with the virtual chat communication session, branch team member analysis based on stored branch team member data associated with one or more branch team members of the financial institution.

In accordance with process block 1110, the branch team member data comprises calendar data, scheduling data, educational data, and professional experience data.

The computer-implemented method 1100 may then proceed to illustrated process block 1112, which includes causing, by the one or more financial institution servers based on the detection, a visual display of a graphical user interface (GUI) on a user interface of the client device, the GUI comprising a user-engageable link that, when engaged by the user, facilitates a routing of the virtual chat communication session to a branch team member of the financial institution that is at a branch office located within a predetermined threshold distance from the detected current geographic location of the client device.

Figure 12:
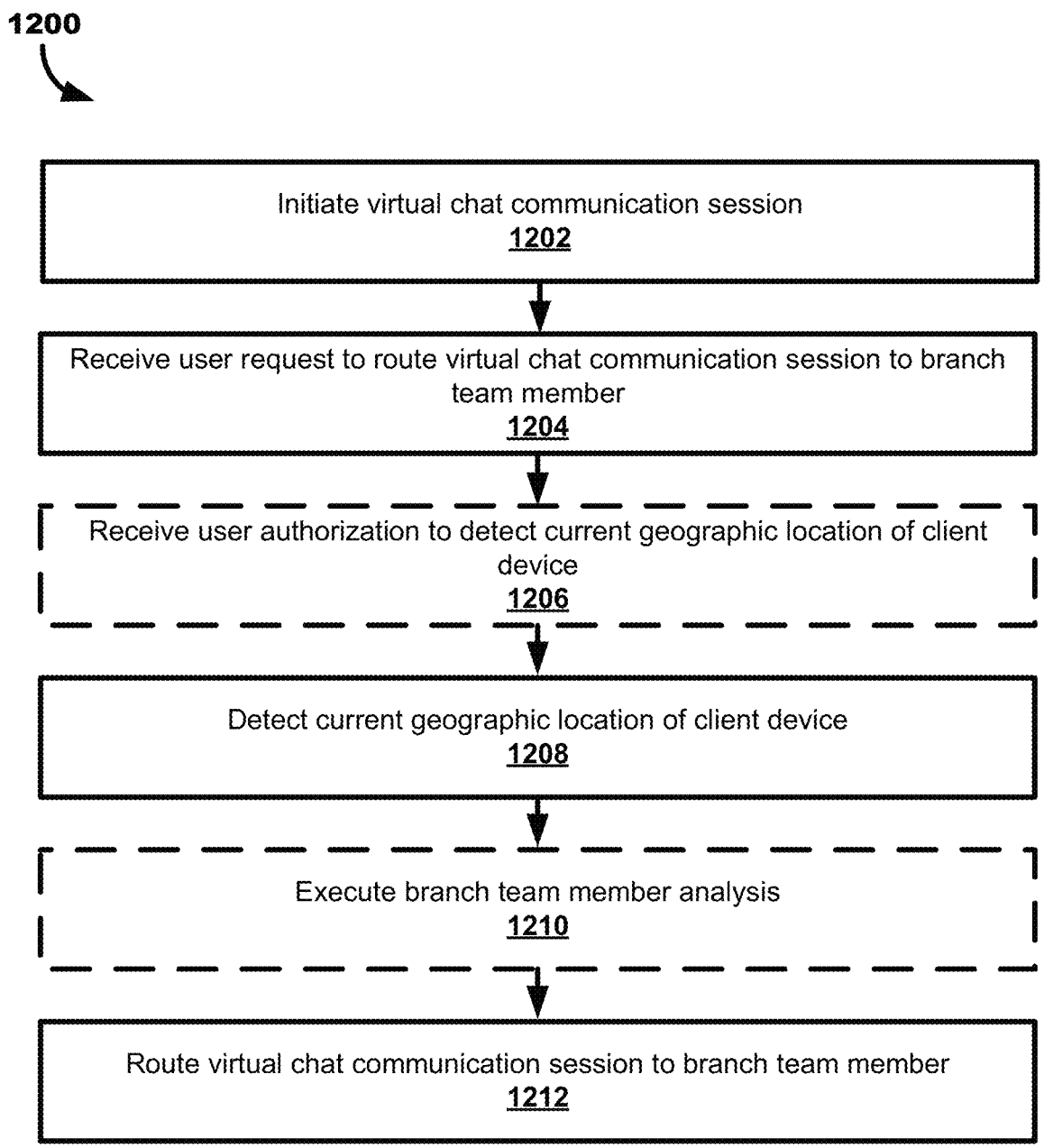

As illustrated in FIG. 12, illustrated process block 1202 includes causing, by one or more financial institution servers associated with a financial institution during execution of a mobile application or desktop application associated with the financial institution by a client device of a user over a communication network, a visual display of a chat interface on the client device to facilitate a virtual chat communication session between the user and a virtual support agent of the financial institution.

The computer-implemented method 1200 may then proceed to illustrated process block 1204, which includes receiving, by the one or more financial institution servers contemporaneously with the virtual chat communication session, a request to route the virtual chat communication session to a branch team member of the financial institution.

The computer-implemented method 1200 may then proceed to illustrated process block 1206, which includes receiving, by the one or more financial institution servers from the client device, authorization to detect, a current geographic location of the client device. The authorization can occur temporally before initiation of the virtual chat communication session, or can occur contemporaneously therewith.

The computer-implemented method 1200 may then proceed to illustrated process block 1208, which includes detecting, by the one or more financial institution servers in response to receiving the authorization, a current geographic location of the client device. The detection can occur temporally before initiation of the virtual chat communication session, or can occur contemporaneously therewith.

In accordance with process block 1208, the detection of the current geographic location of the client device is based on wireless network connectivity data, stored geographic location data, and sensor data relating to the client device.

The computer-implemented method 1200 may then proceed to illustrated process block 1210, which includes executing, by the one or more financial institution servers contemporaneously with the virtual chat communication session, branch team member analysis based on stored branch team member data associated with one or more branch team members of the financial institution.

In accordance with process block 1210, the branch team member data comprises calendar data, scheduling data, educational data, and professional experience data.

The computer-implemented method 1200 may then proceed to illustrated process block 1212, which includes causing, by the one or more financial institution servers based on the detection, routing of the virtual chat communication session to a branch team member of the financial institution that is at a branch office located within a predetermined threshold distance from the detected current geographic location of the client device.

Figure 13:
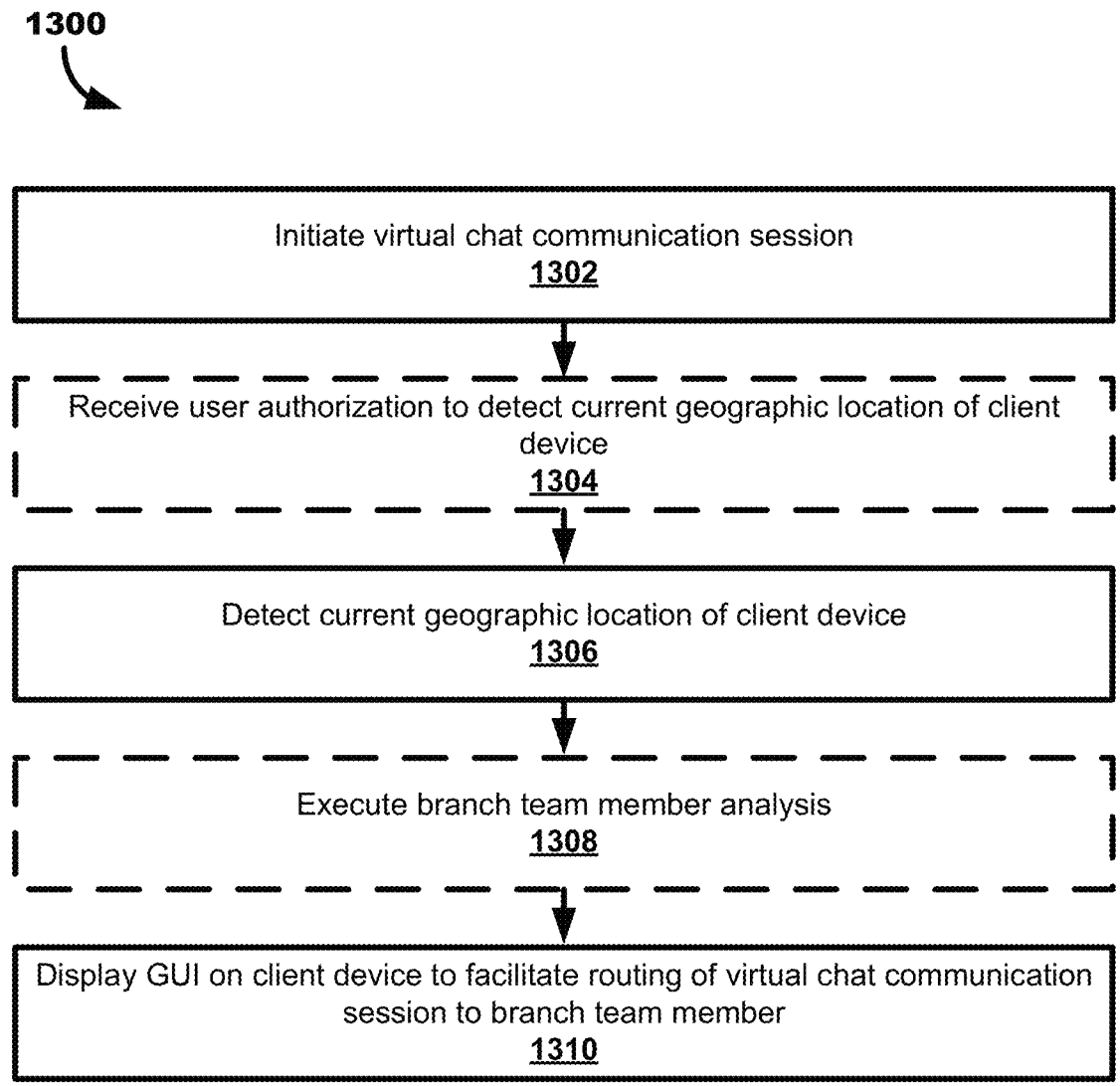

As illustrated in FIG. 13, illustrated process block 1302 includes causing, by one or more financial institution servers associated with a financial institution during execution of a mobile application or desktop application associated with the financial institution by a client device of a user over a communication network, a visual display of a chat interface on the client device to facilitate a virtual chat communication session between the user and a virtual support agent of the financial institution.

The computer-implemented method 1300 may then proceed to illustrated process block 1304, which includes receiving, by the one or more financial institution servers contemporaneously with the virtual chat communication session, authorization to detect a current geographic location of the client device. The authorization can occur temporally before initiation of the virtual chat communication session, or can occur contemporaneously therewith.

The computer-implemented method 1300 may then proceed to illustrated process block 1306, which includes detecting, by the one or more financial institution servers in response to receiving the authorization, a current geographic location of the client device. The detection can occur temporally before initiation of the virtual chat communication session, or can occur contemporaneously therewith.

In accordance with process block 1306, the detection of the current geographic location of the client device is based on wireless network connectivity data, stored geographic location data, and sensor data relating to the client device.

The computer-implemented method 1300 may then proceed to illustrated process block 1308, which includes executing, by the one or more financial institution servers contemporaneously with the virtual chat communication session, branch team member analysis based on stored branch team member data associated with one or more branch team members of the financial institution.

In accordance with process block 1308, the branch team member data comprises calendar data, scheduling data, educational data, and professional experience data.

The computer-implemented method 1300 may then proceed to illustrated process block 1310, which includes causing, by the one or more financial institution servers based on the detection, a visual display of a graphical user interface (GUI) on a user interface of the client device, the GUI comprising a user-engageable link that, when engaged by the user, facilitates a routing of the virtual chat communication session to a branch team member of the financial institution that is at a branch office located within a predetermined threshold distance from the detected current geographic location of the client device.

Figure 14:
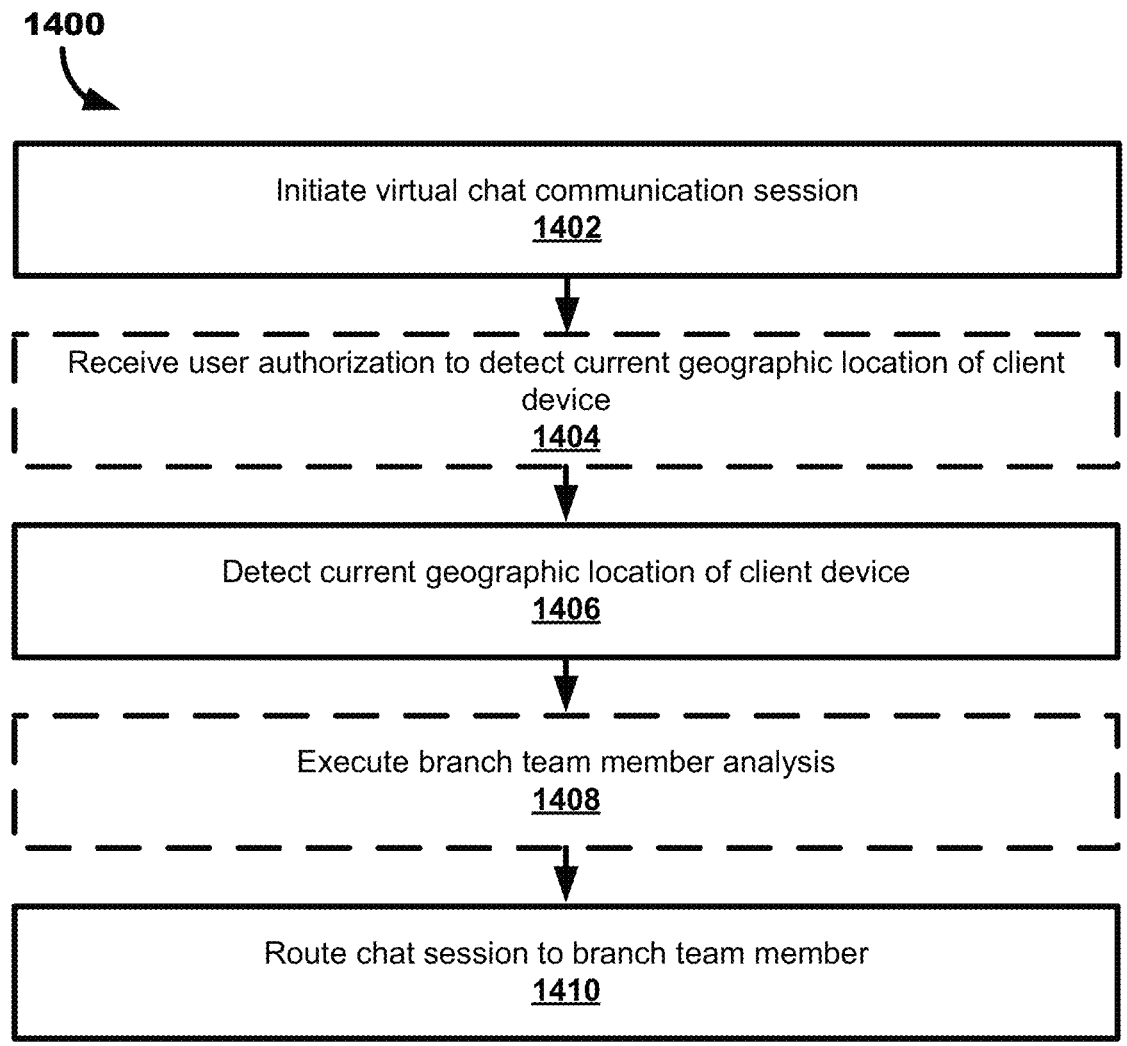

As illustrated in FIG. 14, illustrated process block 1402 includes causing, by one or more financial institution servers associated with a financial institution during execution of a mobile application or desktop application associated with the financial institution by a client device of a user over a communication network, a visual display of a chat interface on the client device to facilitate a virtual chat communication session between the user and a virtual support agent of the financial institution.

The computer-implemented method 1400 may then proceed to illustrated process block 1404, which includes receiving, by the one or more financial institution servers contemporaneously with the virtual chat communication session, authorization to detect a current geographic location of the client device. The authorization can occur temporally before initiation of the virtual chat communication session, or can occur contemporaneously therewith.

The computer-implemented method 1400 may then proceed to illustrated process block 1406, which includes detecting, by the one or more financial institution servers in response to receiving the authorization, a current geographic location of the client device. The detection can occur temporally before initiation of the virtual chat communication session, or can occur contemporaneously therewith.

In accordance with process block 1406, the detection of the current geographic location of the client device is based on wireless network connectivity data, stored geographic location data, and sensor data relating to the client device.

The computer-implemented method 1400 may then proceed to illustrated process block 1408, which includes executing, by the one or more financial institution servers contemporaneously with the virtual chat communication session, branch team member analysis based on stored branch team member data associated with one or more branch team members of the financial institution.

In accordance with process block 1408, the branch team member data comprises calendar data, scheduling data, educational data, and professional experience data.

The computer-implemented method 1400 may then proceed to illustrated process block 1410, which includes causing, by the one or more financial institution servers based on the detection, routing of the virtual chat communication session to a branch team member of the financial institution that is at a branch office located within a predetermined threshold distance from the detected current geographic location of the client device.

Figure 15:
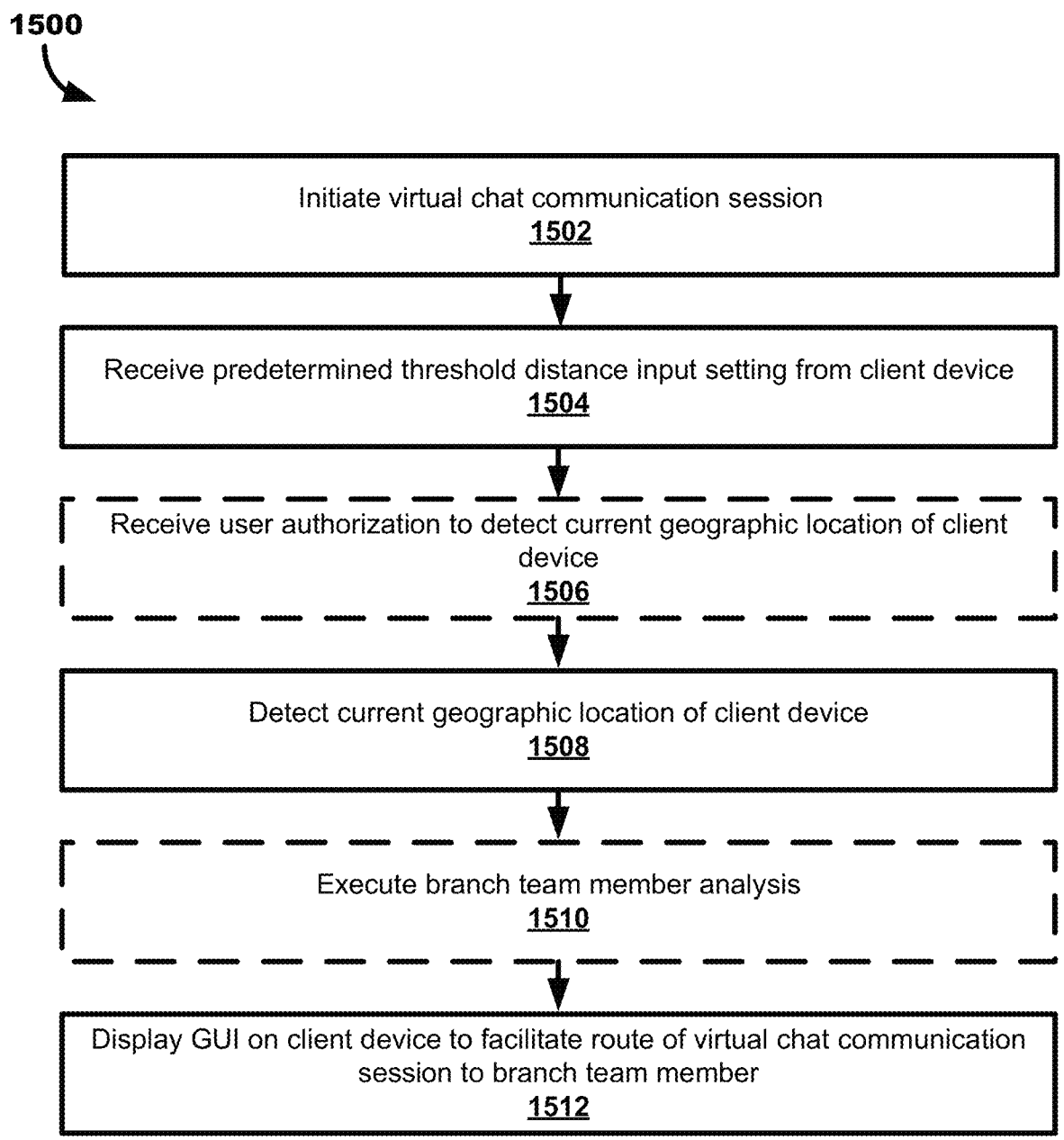

As illustrated in FIG. 15, illustrated process block 1502 includes causing, by one or more financial institution servers associated with a financial institution during execution of a mobile application or desktop application associated with the financial institution by a client device of a user over a communication network, a visual display of a chat interface on the client device to facilitate a virtual chat communication session between the user and a virtual support agent of the financial institution.

The computer-implemented method 1500 may then proceed to illustrated process block 1504, which includes receiving, by the one or more financial institution servers, a predetermined threshold distance input setting from the client device. The predetermined threshold distance input setting can be received temporally before initiation of the virtual chat communication session, or can occur contemporaneously therewith.

The computer-implemented method 1500 may then proceed to illustrated process block 1506, which includes receiving, by the one or more financial institution servers, authorization to detect a current geographic location of the client device. The authorization can occur temporally before initiation of the virtual chat communication session, or can occur contemporaneously therewith.

The computer-implemented method 1500 may then proceed to illustrated process block 1508, which includes detecting, by the one or more financial institution servers in response to receiving the authorization, a current geographic location of the client device. The detection can occur temporally before initiation of the virtual chat communication session, or can occur contemporaneously therewith.

In accordance with process block 1508, the detection of the current geographic location of the client device is based on wireless network connectivity data, stored geographic location data, and sensor data relating to the client device.

The computer-implemented method 1500 may then proceed to illustrated process block 1510, which includes executing, by the one or more financial institution servers contemporaneously with the virtual chat communication session, branch team member analysis based on stored branch team member data associated with one or more branch team members of the financial institution.

In accordance with process block 1510, the branch team member data comprises calendar data, scheduling data, educational data, and professional experience data.

The computer-implemented method 1500 may then proceed to illustrated process block 1512, which includes causing, by the one or more financial institution servers based on the detection, a visual display of a graphical user interface (GUI) on a user interface of the client device, the GUI comprising a user-engageable link that, when engaged by the user, facilitates a routing of the virtual chat communication session to a branch team member of the financial institution that is at a branch office located within the predetermined threshold distance from the detected current geographic location of the client device.

Figure 16:
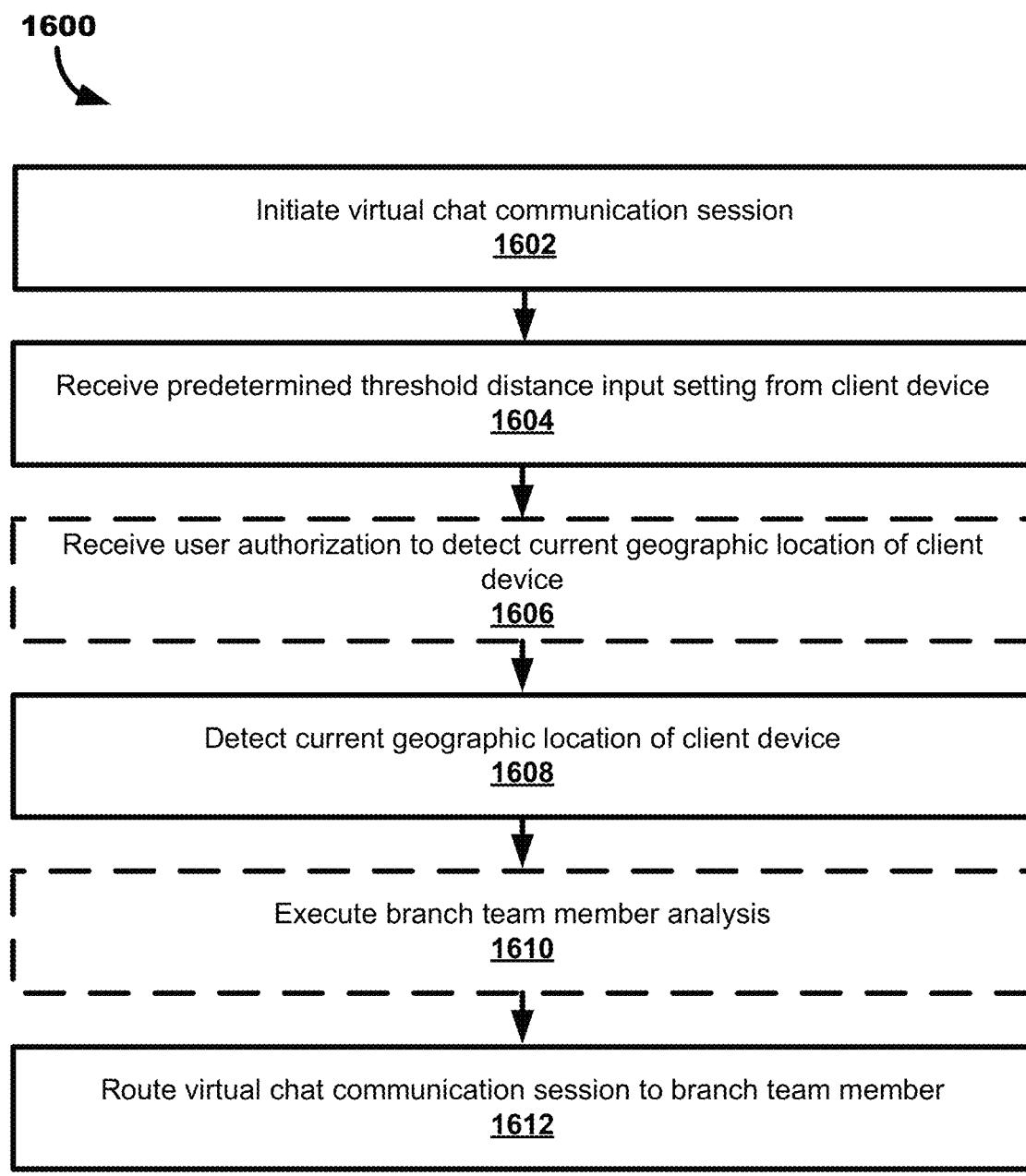

As illustrated in FIG. 16, illustrated process block 1602 includes causing, by one or more financial institution servers associated with a financial institution during execution of a mobile application or desktop application associated with the financial institution by a client device of a user over a communication network, a visual display of a chat interface on the client device to facilitate a virtual chat communication session between the user and a virtual support agent of the financial institution.

The computer-implemented method 1600 may then proceed to illustrated process block 1604, which includes receiving, by the one or more financial institution servers contemporaneously with the virtual chat communication session, a predetermined threshold distance input setting from the client device. The predetermined threshold distance input setting can be received temporally before initiation of the virtual chat communication session, or can occur contemporaneously therewith.

The computer-implemented method 1600 may then proceed to illustrated process block 1606, which includes receiving, by the one or more financial institution servers, authorization to detect a current geographic location of the client device. The authorization can occur temporally before initiation of the virtual chat communication session, or can occur contemporaneously therewith.

The computer-implemented method 1600 may then proceed to illustrated process block 1608, which includes detecting, by the one or more financial institution servers in response to receiving the authorization, a current geographic location of the client device. The detection can occur temporally before initiation of the virtual chat communication session, or can occur contemporaneously therewith.

In accordance with process block 1608, the detection of the current geographic location of the client device is based on wireless network connectivity data, stored geographic location data, and sensor data relating to the client device.

The computer-implemented method 1600 may then proceed to illustrated process block 1610, which includes executing, by the one or more financial institution servers contemporaneously with the virtual chat communication session, branch team member analysis based on stored branch team member data associated with one or more branch team members of the financial institution.

In accordance with process block 1610, the branch team member data comprises calendar data, scheduling data, educational data, and professional experience data.

The computer-implemented method 1600 may then proceed to illustrated process block 1612, which includes causing, by the one or more financial institution servers based on the detection, routing of the virtual chat communication session to a branch team member of the financial institution that is at a branch office located within the predetermined threshold distance from the detected current geographic location of the client device.

In accordance with one or more embodiments set forth, described, and/or illustrated herein, the client device 100 and the one or more financial institution servers 200 could function in a fully virtualized environment. A virtual machine is where all hardware is virtual and operation is run over a virtual processor. The benefits of computer virtualization have been recognized as greatly increasing the computational efficiency and flexibility of a computing hardware platform. For example, computer virtualization facilitates multiple virtual computing machines to execute on a common computing hardware platform. Similar to a physical computing hardware platform, virtual computing machines include storage media, such as virtual hard disks, virtual processors, and other system components associated with a computing environment. For example, a virtual hard disk can store the operating system, data, and application files for a virtual machine. Virtualized computer system includes computing device or physical hardware platform, virtualization software running on hardware platform, and one or more virtual machines running on hardware platform by way of virtualization software. Virtualization software is therefore logically interposed between the physical hardware of hardware platform and guest system software running "in" virtual machine.

Memory of the hardware platform may store virtualization software and guest system software running in virtual machine. Virtualization software performs system resource management and virtual machine emulation. Virtual machine emulation may be performed by a virtual machine monitor (VMM) component. In typical implementations, each virtual machine (only one shown) has a corresponding VMM instance. Depending on implementation, virtualization software may be unhosted or hosted. Unhosted virtualization software generally relies on a specialized virtualization kernel for managing system resources, whereas hosted virtualization software relies on a commodity operating system: the "host operating system," such as Windows or Linux to manage system resources. In a hosted virtualization system, the host operating system may be considered as part of virtualization software.

The system and method described herein may be at least partially processor-implemented, the one or more processors 210 being an example of hardware. For example, at least some of the operations of the computer-implemented methods may be performed by the one or more processors 210 or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors 210, not only residing within a single machine, but deployed across a plurality of machines. In some example embodiments, the one or more processors 210 or processor-implemented modules may be located in a single geographic location (e.g., within a home environment, an office environment, or a server farm). In other example embodiments, the one or more processors or processor-implemented modules may be distributed across a plurality of geographic locations.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, devices that are in communication with or coupled with each other may communicate directly or indirectly through one or more intermediaries.

The terms "coupled," "attached," or "connected" may be used herein to refer to any type of relationship, direct or indirect, between the components in question, and may apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A server computer system, comprising:
one or more financial institution servers comprising a sensor module, an automated virtual support agent, a human virtual support agent module, one or more processors having at least one hardware circuit, and a non-transitory memory coupled to the one or more processors, the non-transitory memory including a set of instructions of computer-executable program code, which when executed by the one or more processors, cause the one or more processors to perform a computer-implemented method for interacting with an authenticated client device, the computer-implemented method comprising:
storing branch team member data for one or more branch team members of a financial institution;
receiving, from the authenticated client device, a threshold distance, and storing the threshold distance;
displaying a graphical user interface (GUI) comprising a chat interface in a virtual chat communication session;
executing the automated virtual support agent and the human virtual support agent module;
receiving, via the executing automated virtual support agent and from the authenticated client device, a first request via the chat interface in the virtual chat communication session;
transmitting, via the executing automated virtual support agent, a hold prompt to the authenticated client device over the chat interface in the virtual chat communication session;
requesting, via the executing automated virtual support agent, authorization for detection of a geographic location of the authenticated client device;
receiving, via the executing automated virtual support agent, the authorization for detection of the geographical location from the authenticated client device;
detecting, via the sensor module, the geographic location of the authenticated client device;
identifying, via the executing automated virtual support agent, a branch team member of the one or more branch team members of the financial institution by analyzing the detected geographic location, the stored branch team member data for one or more branch team members of the financial institution, and the stored threshold distance;
displaying, via the executing automated virtual support agent, an engageable link in the chat interface in the virtual chat communication session; and
determining, via the executing automated virtual support agent, that the link has been engaged, and based on the determining that the link has been engaged, routing, via the executing automated virtual support agent, the virtual chat communication session to a computer of the identified branch team member.

2. The server computer system of claim 1, wherein detecting the geographic location of the authenticated client device comprises detecting the geographic location of the authenticated client device based on wireless network connectivity data, stored geographic location data, and sensor data relating to the authenticated client device.

3. The server computer system of claim 1, wherein the branch team member data comprises calendar data, scheduling data, educational data, and professional experience data.

4. A computer program product comprising at least one non-transitory computer readable medium having with a set of instructions of computer-executable program code, which when executed by one or more processors of one or more financial institution servers comprising a sensor module, an automated virtual support agent, and a human virtual support agent module, cause the one or more processors to perform a computer-implemented method for interacting with an authenticated client device, the computer-implemented method comprising:
storing branch team member data for one or more branch team members of a financial institution;
receiving, from the authenticated client device, a threshold distance, and storing the threshold distance;
displaying a graphical user interface (GUI) comprising a chat interface in a virtual chat communication session;
executing the automated virtual support agent and the human virtual support agent module;
receiving, via the executing automated virtual support agent and from the authenticated client device, a first request via the chat interface in the virtual chat communication session;
transmitting, via the executing automated virtual support agent, a hold prompt to the authenticated client device over the chat interface in the virtual chat communication session;
requesting, via the executing automated virtual support agent, authorization for detection of a geographic location of the authenticated client device;
receiving, via the executing automated virtual support agent, the authorization for detection of the geographical location from the authenticated client device;
detecting, via the sensor module, the geographic location of the authenticated client device;
identifying, via the executing automated virtual support agent, a branch team member of the one or more branch team members of the financial institution by analyzing the detected geographic location, the stored branch team member data for one or more branch team members of the financial institution, and the stored threshold distance;
displaying, via the executing automated virtual support agent, an engageable link in the chat interface in the virtual chat communication session; and
determining, via the executing automated virtual support agent, that the link has been engaged, and based on the determining that the link has been engaged, routing, via the executing automated virtual support agent, the virtual chat communication session to a computer of the identified branch team member.

5. The computer program product of claim 4, wherein detecting the geographic location of the authenticated client device comprises detecting the geographic location of the client device based on wireless network connectivity data, stored geographic location data, and sensor data relating to the authenticated client device.

6. The computer program product of claim 4, wherein the branch team member data comprises calendar data, scheduling data, educational data, and professional experience data.

7. A computer-implemented method for interacting with an authenticated client device, the computer-implemented method comprising:

storing, by one or more financial institution servers comprising a sensor module, an automated virtual support agent, and a human virtual support agent module, branch team member data for one or more branch team members of a financial institution;

receiving, by the one or more financial institution servers from the authenticated client device, a threshold distance, and storing, by the one or more financial institution servers, the threshold distance;

displaying by the one or more financial institution servers, a graphical user interface (GUI) comprising a chat interface in a virtual chat communication session;

executing, by the one or more financial servers, the automated virtual support agent and the human virtual support agent module;

receiving, by the executing automated virtual support agent, from the authenticated client device, a first request via the chat interface in the virtual chat communication session;

transmitting, by the executing automated virtual support agent, a hold prompt to the authenticated client device over the chat interface in the virtual chat communication session;

requesting, by the executing automated virtual support agent, authorization for detection of a geographic location of the authenticated client device;

receiving, by the one or more financial institution servers via the executing automated virtual support agent, the authorization for detection of the geographical location from the authenticated client device;

detecting, by the one or more financial institution servers via the sensor module, the geographic location of the authenticated client device;

identifying, by the executing automated virtual support agent, a branch team member of the one or more branch team members of the financial institution by analyzing the detected geographic location, the stored branch team member data for one or more branch team members of the financial institution, and the stored threshold distance;

displaying, by the executing automated virtual support agent, an engageable link in the chat interface in the virtual chat communication session; and determining, by the executing automated virtual support agent, that the link has been engaged, and based on the determining that the link has been engaged, routing, by the executing automated virtual support agent, the virtual chat communication session to a computer of the identified branch team member.

8. The computer-implemented method of claim 7, wherein the branch team member data comprises calendar data, scheduling data, educational data, and professional experience data.

* * * * *